(12) United States Patent
Shibuya et al.

(10) Patent No.: US 6,747,364 B1
(45) Date of Patent: Jun. 8, 2004

(54) ELECTRONIC DEVICE HAVING RETRACTABLE MOVABLE MEMBER PROVIDED ON FRONT SURFACE

(75) Inventors: Yasushi Shibuya, Iwaki (JP); Masaru Yagi, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/492,578

(22) Filed: Jan. 27, 2000

(30) Foreign Application Priority Data

Feb. 2, 1999 (JP) ............................................. 11-024829
Feb. 2, 1999 (JP) ............................................. 11-024830
Feb. 2, 1999 (JP) ............................................. 11-024831

(51) Int. Cl.⁷ .................................................. B60L 1/00

(52) U.S. Cl. ...................................................... 307/9.1

(58) Field of Search ......................... 307/9.1, 10.1, 307/10.2; 361/683, 686; 455/347, 348; 248/551, 27.1, 201, 27.3, 674, 678; 224/282, 48.3

(56) References Cited

U.S. PATENT DOCUMENTS

| | | | | |
|---|---|---|---|---|
| 3,832,909 A | * | 9/1974 | Pflin | ............................. 74/12 |
| 5,517,345 A | * | 5/1996 | Joaille | ........................ 398/112 |
| 5,610,376 A | | 3/1997 | Takagi et al. | |
| 5,815,468 A | * | 9/1998 | Muramatsu et al. | ........... 369/2 |

* cited by examiner

Primary Examiner—Gregory J. Toatley, Jr.
(74) Attorney, Agent, or Firm—Brinks Hofer Gilson & Lione

(57) ABSTRACT

An in-car electronic device with an anti-theft feature overcomes shortcomings of a conventional in-car electronic device with an anti-theft feature in which a face provided on a front surface of a casing is detached and carried out of a car. In the conventional type, the face carried out may be lost or left somewhere. The in-car electronic device in accordance with the present invention has an opening in a front panel of a casing, and the face in a regular position on the front of the front panel is circularly moved in a horizontal direction and retracted in the casing through the opening. In the retracted position, a bottom edge of the face is flush with a face detaching surface of the front panel. This arrangement makes it look as if the face had been removed from the face detaching surface.

19 Claims, 14 Drawing Sheets

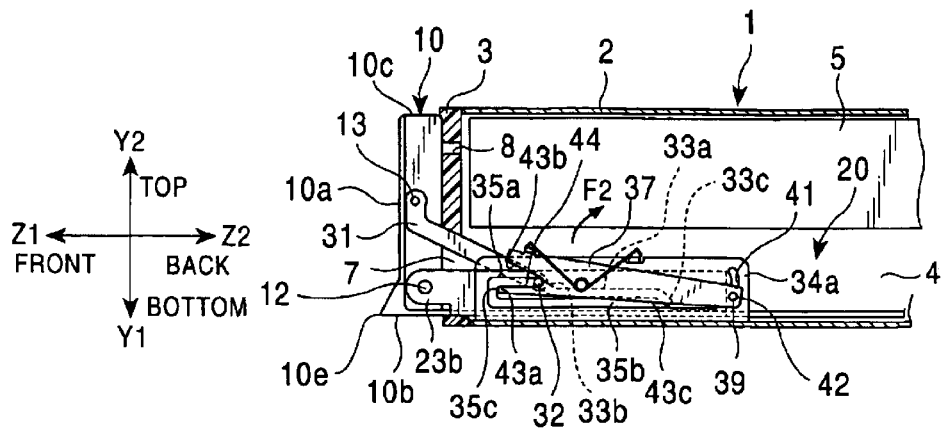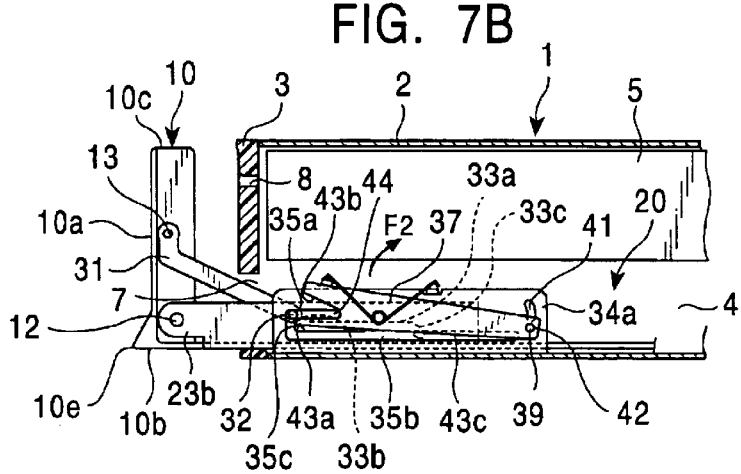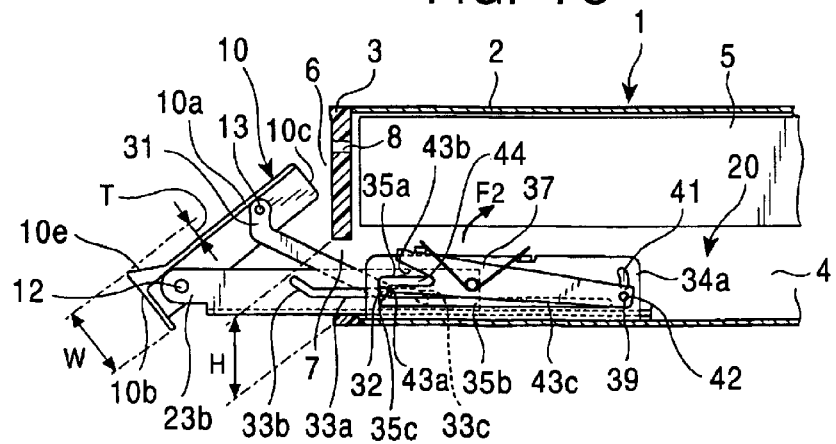

ELECTRONIC DEVICE HAVING RETRACTABLE MOVABLE MEMBER PROVIDED ON FRONT SURFACE

BACKGROUND OF THE INVENTION

1. Field of the Invention

The present invention relates to an in-car electronic device provided with an anti-theft feature that protects the device from a thief by moving a movable member provided with a display member and/or a control member from a regular position, where the device is out of its casing for viewing or accessible to a user, to a retracted position where the device is accommodated in the casing.

2. Description of the Related Art

An in-car electronic device, such as an audio system or car navigation system, is housed in a casing of a 1DIN size or the like and embedded in a dashboard or an instrument panel in a passenger compartment of a car. A face provided on the front of the casing is set so that it is substantially flush with the dashboard, the instrument panel, etc. Control members provided on a surface of the face are used to control electronic circuits and a variety of recording medium drive units in the casing.

There has been a detachable face to protect the foregoing type of in-car electronic device from being removed and stolen from a car while the car is parked. In this detachable face type, only the face can be detached and taken out of the car to disable the operation of the in-car electronic device left in the car, thereby protecting the device from theft.

There is another structure in which a face provided on a front face of a casing is reversed so that a control panel faces toward the casing while parking or the like. This is to make it look as if no in-car electronic device were installed in the car by reversing the face.

However, in the structure wherein the face is detached from the casing and carried out of a car, there is a danger in that the face that has been carried out is lost or the face is left at home when it should be brought back in the car. As a result, the in-car electronic device cannot be operated.

Furthermore, frequently repeated attaching and detaching of the face wears contacts provided between the face and the casing, leading to a possibility of adversely affecting displays on display members or operation performed through control members provided on the face. Damage to a locking mechanism provided between the face and the casing may interfere with secure attachment of the face to the front surface of the casing.

The type where the face is reversed requires an extremely complicated mechanism for reversing the face at the front of the casing.

SUMMARY OF THE INVENTION

Accordingly, the present invention has been made with a view toward solving the problems described above, and it is an object thereof to provide an in-car electronic device with an anti-theft feature for protecting the electronic device from a thief by keeping a face absent from a front surface of a casing when not in use, without the need for detaching the face from the casing or reversing the face.

Another object of the present invention is to provide an in-car electronic device with an anti-theft feature in which a face can be automatically retracted to a position where the face is not seen on a front surface of the casing to thereby permit the face to be easily hidden.

To these ends, according to one aspect of the present invention, there is provided an in-car electronic device with an anti-theft feature, including: a fixed front surface which is provided on a front surface of a casing incorporating an electronic circuit and mainly formed of a flat surface; a movable member which can be installed in a regular position to cover a front of the fixed front surface and a surface of which is provided with a control surface having a display member and/or a control member; and position changing means for moving the movable member between the regular position and a retracted position where the movable member is circularly moved by substantially 90 degrees from the regular position so as to be retracted in an opening, wherein an end surface of the movable member in the retracted position is substantially flush with the fixed front surface.

According to the present invention, when the in-car electronic device is not in use or during parking, the movable member that has been in the regular position is housed in the casing to hide it. At this time, mainly the flat surface is exposed on the front surface of the casing, and the opening in which the movable member has been placed is covered by an end surface of the movable member. With this arrangement, the movable member can be made to look as if it had been removed from the casing front surface, thus preventing the in-car electronic device from being stolen.

Preferably, an end portion of the movable member is provided with a protuberant portion that extends toward a front surface providing a control surface or toward a rear surface, and when the movable member moves toward the retracted position, the opening is closed by the end portion of the movable member after the display member and/or the control member passes by the opening.

The position changing means is driven by power of a motor driver, and the movable member can be automatically moved between the regular position and the retracted position by the power of the motor driver.

In a case wherein the position changing means is driven by the motor driver, the retracted position of the movable member can be immediately reached by operating a switch or the like of the control member provided on the movable member. When moving the movable member from the retracted position to the regular position, an arrangement may be made so that the switch is turned ON by, for example, manually pressing the end portion of the movable member or a cover exposed at the opening in a retracted state so as to start the motor driver to move the movable member from the retracted position to the regular position.

The position changing means is not limited to the one driven by the power of the motor driver. For instance, the movable member in the regular position may alternatively be circularly moved by hand to its retracted position, or a face in the retracted position may be pushed by hand to cause the face to project from the opening by a predetermined amount, then circularly moved to the regular position by hand.

As another alternative, the motor driver may be controlled so that the movable member is stopped in a state wherein the control surface is aslant in the middle of travel of the movable member from the regular position to the retracted position.

Making the movable member stop aslant causes the control surface of the movable member to be positioned aslant in a car, permitting easier operation through the control surface.

In the present invention, the movable member may circularly move, using one end thereof as a support point, frontward from the regular position to a horizontal position, then moved into the casing. Preferably, however, the movable member moves between the regular position and the retracted position as described below.

Preferably, when one direction along an arbitrary lateral edge of the fixed front surface is defined as a first side, and the other direction is defined as a second side, the opening is provided at a position closer to the first side in the fixed front surface, the movable member is controlled in its position by the position changing means so that an end portion thereof on the first side advances forward from the regular position and an end portion thereof on the second side circularly moves toward the first side, then the end portion on the second side is oriented toward the casing and entered into the opening to reach the retracted position.

For example, the first side is a bottom side, while the second side is a top side. As an alternative, the first side may be a right side (or a left side), while the second side may be the left side (or the right side). More specifically, the movable member circularly moves from a slanted position wherein the control surface faces upward to a substantially horizontal position and directly moves into the casing. Alternatively, the movable member circularly moves from the slanted position wherein the control surface faces rightward or leftward to a substantially lateral position and directly moves into the casing.

Preferably, the fixed front surface is provided with a secret control member for projecting the retracted movable member from the opening. More specifically, when the position of the movable member is changed by the power of the motor, an end surface of the movable member exposed from the opening may be pushed by hand to operate a switch. Alternatively, at least one motor start switch may be provided on the fixed front surface so as to start the operation for projecting the retracted movable member by operating the switch. In this case, if the switch is noticeable, then a stranger may press the switch to project the movable member. Hence, the switch should be a hidden switch that cannot be easily found on the fixed front surface.

In a preferred form, a password signal for authorizing display operation and/or control of the movable member is enabled to be entered using a control member provided on the control surface of the movable member, when the movable member is projected to an accessible position from the retracted position.

Employing the password signal system makes it possible to enhance the anti-theft effect because the electronic device cannot be set in an operable mode unless a stranger enters a proper password signal even if the stranger successfully shifts the movable member from the retracted position to the regular position.

According to another aspect of the present invention, there is provided an in-car electronic device including: a fixed front surface which is provided on a front surface of a casing having an electronic circuit therein and mainly formed of a flat surface; a movable member which can be installed in a regular position to cover a front of the fixed front surface and a surface of which is provided with a control surface having a display member and/or a control member; position changing means for moving the movable member between the regular position and a retracted position where the movable member is circularly moved by substantially 90 degrees from the regular position so as to be retracted in a opening; and a cover that covers the opening in the retracted position.

Using the cover enables the opening to be fully closed even if an opening width of the opening is set to be larger than a thickness of the movable member so as to permit the movable member and the control member and the display member provided on the movable member to be retracted with allowance so that they do not hit edges of the opening. The cover may be a shutter type that is provided on a rear side of the fixed front surface to release or close the opening, and the cover may alternatively be provided at a bottom edge of a face as shown in an embodiment. In this case, the face may be arranged such that the cover does not jut out toward the front of the face in the regular position, and the cover circularly moves to cover the opening when the face is retracted in the casing.

According to still another aspect of the present invention, there is provided an electronic device including: a casing, a movable member provided with a display member and/or a control member; and position control means for moving the movable member between a retracted position wherein the movable member is retracted in the casing and a regular position wherein the movable member is oriented perpendicularly to the retracted position after the movable member is projected out of the casing, wherein the position control means is equipped with: a first support point and a second support point at which the movable member is supported laterally; a reciprocating member that is coupled to the first support point and moves forward and backward along the casing; a position changing member having one end thereof coupled to the second support point and the other end thereof provided with a control support point engaging the reciprocating member; a switching member having a retracted position guiding portion that guides the control support point toward a rear of the casing to move the movable member to the retracted position when the reciprocating member recedes from an advanced position, a regular position guiding portion that restricts a backward movement of the control support point to allow the movable member to move to the regular position when the reciprocating member recedes from the advanced position, and a switching portion that switches between the retracted position guiding portion and the regular position guiding portion; and a selecting member for selecting whether the control support point should be led to the retracted position guiding portion or the regular position guiding portion when the reciprocating member recedes from the advanced position.

In the present invention, in the series of operations of moving the reciprocating member forward and backward, the movable member can be set in the retracted position or the regular position simply by switching a path of control position. This arrangement permits a series of smooth operations of the movable member and also permits the operations to be quickly completed. Moreover, the use of the selecting member makes it possible to securely switch between the retracted position and the regular position. Preferably, the forward and backward travels of the reciprocating member are implemented in succession. Alternatively, however, the reciprocating member may start the backward travel after a brief stop following the forward travel.

The selecting member is set at a restricting position where it blocks the retracted position guiding portion to restrain the control support point from moving back into the retracted position guiding portion when the control support point moves from the retracted position to a front end of the retracted position guiding portion, and at a restriction release position where the selecting member clears the foregoing restriction so as to allow the control support point to enter the retracted position guiding portion when the reciprocating member travels backward from the regular position.

By operating the selecting member as described above, the movement of the movable member can be securely switched. A power source, such as a solenoid device or motor, may be used to move the selecting member to the restricting position and the restriction release position. A mechanism for this purpose can be extremely simplified by configuring the mechanism as described below.

For instance, the following arrangement is possible. More specifically, the selecting member is urged toward the restricting position by an urging member. When the movable member shifts to the regular position, a moving force of the control support point toward the regular position guiding portion causes the selecting member to be slightly locked in the restriction release position. When the movable member shifts to the retracted position, the moving force of the control support point traveling away from the retracted position guiding portion releases the slight lock.

It is assumed that the reciprocating member is provided with a guiding section where the control support point moves. The guiding section is equipped with a linear guiding portion extending longitudinally, a slant guiding portion that leads the control support point to the retracted position guiding portion when the reciprocating member advances, and another slant guiding portion that leads the control support point to the regular position guiding portion when the reciprocating member recedes.

When the retracted position guiding portion and the regular position guiding portion are formed in a V shape via a dividing point, the control support point can be securely guided to the retracted position guiding portion and the regular position guiding portion by using the selecting member alone. However, when the retracted position guiding portion and the regular position guiding portion are disposed in parallel and the dividing path is formed at right angles to the two guiding portions, with the guiding section formed substantially like a U shape as in the case of the embodiment, it is difficult to securely guide the control support point to the retracted position guiding portion and the regular position guiding portion by the selecting member alone. To overcome this difficulty, the slant guiding portions are provided on the reciprocating member. With this arrangement, the control point can be reliably led to the retracted position guiding portion and the regular position guiding portion laid out in the U shape as mentioned above.

Preferably, the reciprocating member is moved forward and backward by the power of the motor driver so as to automatically move the movable member between the regular position and the retracted position. Alternatively, however, the movable member may be manually moved between the retracted position and the regular position.

In a preferred form, when one direction along an arbitrary lateral edge of a front panel provided on the front surface of the casing is defined as a first side, and the other direction is defined as a second side, the opening is provided at a position closer to the first side in the front panel, the first support point is provided at the first side of the movable member, while the second support point is provided at a position closer to the second side away from the first support point, the regular position guiding portion of the switching member is provided at a position closer to the second side away from the retracted position guiding portion, and an end portion of the movable member on the first side advances and an end portion thereof on the second side circularly moves to approach the first side when the reciprocating member advances from the regular position, then the end portion on the second side enters the opening first and reaches the retracted position when the reciprocating member recedes.

For example, the first side is a bottom side, while the second side is a top side. Alternatively, the first side may be a right side (or a left side), while the second side may be the left side (or the right side). More specifically, the movable member circularly moves from a slanted position wherein the control surface faces upward to a substantially horizontal position and directly moves into the casing. Alternatively, the movable member circularly moves from the slanted position wherein the control surface faces rightward or leftward to a substantially lateral position and directly moves into the casing.

Furthermore, the regular position guiding portion extends toward the rear beyond the dividing portion and in parallel to the retracted position guiding portion, being shorter than the retracted position guiding portion. As the reciprocating member advances when the movable member is in the regular position, the control support point advances in the regular position guiding portion. At this time, the movable member moves forward in parallel, then when the reciprocating member recedes, the control support point shifts via the dividing portion to the retracted position guiding portion. Thus, the movable member is oriented substantially perpendicularly to the front surface of the front panel and placed in the casing.

With this arrangement, the movable member moves in parallel without inclining forward from the regular position, then starts circular movement in which the end portion on the first side of the movable member moves forward and the end portion on the second side approaches the first side. This enables the movable member to securely move circularly at the front, and even if the panel front face has protuberances, such as knobs, the movable member does not come into contact with the protuberances when it circularly moves.

If the regular position guiding portion is not extended toward the rear beyond the dividing portion, and the regular position guiding portion and the retracted position guiding portion are formed to be a V shape via the dividing portion, then the movable member does not move forward in parallel. Instead, the advancing motion of the reciprocating member causes the movable member to immediately start its circular motion.

According to yet another aspect of the present invention, there is provided an electronic device provided with: a casing, a movable member equipped with a display member and/or a control member, and position control means for moving the movable member between a retracted position wherein the movable member is accommodated in the casing and a regular position wherein the movable member is oriented perpendicularly to the retracted position or inclined at a predetermined angle after the movable member projects out of the casing, wherein the position control means is provided with: a motor driver; a first support point and a second support point at which the movable member is supported laterally; a reciprocating member that is coupled to the first support point and moves forward and backward along the casing; a motion converting means for causing the reciprocating member to move forward and backward once by a rotational power of the motor driver in a first direction, and also causing the reciprocating member to move forward and backward once by the rotational power of the motor driver in a second direction; and switching means for switching a moving path of the second support point so that the movable member in the regular position is circularly moved to the retracted position when the reciprocating member is moved forward and backward once by the revolution of the motor driver in the first direction, and that the movable member in the retracted position is projected out of the casing and further circularly moved into the regular position when the reciprocating member is moved forward and backward once by the revolution of the motor driver in the second direction.

The present invention can be applied to an in-car display unit in which a movable member equipped with a display member, such as a liquid crystal TV screen, is extended from a position, where the movable member has been accommodated in a casing, out to the front of the casing and further circularly moved to a vertical position or a slant position for viewing the screen. The present invention can be also applied to an in-car electronic device or an electronic device for home or office use with an anti-thief feature in which a face having control members installed at the front of a casing is accommodated in the casing as described in an embodiment.

In the present invention, the reciprocating member is moved forward and backward once by the rotational power of the motor driver in the first direction, or moved forward and backward once by the rotational power of the motor driver in the second direction, respectively, so as to shift the movable member from the regular position to the retracted position, or from the retracted position to the regular position. Thus, the use of the motion converting means for converting the circular motion into the reciprocating motion makes it possible to configure the mechanism in a limited space in the casing.

Moreover, the reciprocating member makes one reciprocating travel simply by driving the motor driver in one direction while the movable member moves from the retracted position to the regular position or from the regular position to the retracted position. This arrangement eliminates the need for stopping or reversing the motor when the reciprocating member moves forward or backward, permitting easier control of the motor driver.

Furthermore, in the series of the operations for moving the reciprocating member forward and backward, the movable member can be set in the retracted position or the regular position simply by switching the path of a control position. With this arrangement, a series of smooth motions of the movable member can be achieved and the motions can be finished more quickly.

The motion switching means can be constituted by a rotating member rotatably driven in one direction by a rotational power in the first direction of the motor driver and in the other direction by the rotational power in the second direction, and a sliding member that slides a drive cam portion provided on either the reciprocating member or the rotating member against the driving cam portion provided on the other to thereby reciprocate the reciprocating member.

For instance, the reciprocating member can be reciprocated by providing the rotating member with the sliding member and the reciprocating member with a driving cam portion that extends linearly in a direction orthogonal with respect to a moving direction. This arrangement allows the motion converting means to be easily constructed. Alternatively, the reciprocating member is provided with the sliding member, and the rotating member is provided with a driving cam portion, such as a cam groove, to constitute the motion converting means.

Preferably, the forward and backward travels of the reciprocating member are implemented in succession. Alternatively, however, the reciprocating member may start the backward travel after a brief stop following the forward travel.

The switching means is provided, for example, with: a control support point provided on a position changing member rotatably coupled to the second support point; a switching member having a retracted position guiding portion that guides the control support point toward a rear of the casing to move the movable member to the retracted position when the reciprocating member moves backward from an advanced position, a regular position guiding portion that restricts a backward movement of the control support point to allow the movable member to move to the regular position when the reciprocating member moves backward from the advanced position, and a dividing member having a dividing portion that switches between the retracted position guiding portion and the regular position guiding portion; and a selecting member for selecting whether the control support point should be led to the retracted position guiding portion or the regular position guiding portion when the reciprocating member recedes from the advanced position.

In the foregoing means, the selecting member is employed to switch the moving path of the control support point between the regular position guiding portion and the retracted position guiding portion. With this arrangement, the movable member can be securely shifted to the regular position or the retracted position.

Furthermore, the movable member can be stopped at an arbitrary orientation outside the casing by stopping the motor driver in the middle of a reciprocating travel of the reciprocating member when the motor driver rotates in the first direction, or in the middle of a reciprocating travel of the reciprocating member when the motor driver rotates in the second direction.

Thus, by making the arrangement so that the movable member can be stopped at an arbitrary orientation outside the casing by stopping the power of the motor driver in the middle of a travel of the movable member, the movable member can be stopped at an easy-to-see and easy-to-operate orientation.

In addition, when one direction along an arbitrary lateral edge of a front panel of the casing is defined as a first side, and the other direction is defined as a second side, the opening is provided at a position closer to the first side in the front panel, the first support point is provided at the first side of the movable member, while the second support point is provided at a position closer to the second side away from the first support point, the regular position guiding portion of the switching member is provided at the second side away from the retracted position guiding portion, and it is possible to make an arrangement so that an end portion of the movable member on the first side advances forward and an end portion thereof on the second side circularly moves toward the first side when the reciprocating member advances from the regular position, then the end portion on the second side enters the opening first when the movable member is set in the retracted position when the reciprocating member recedes.

BRIEF DESCRIPTION OF THE DRAWINGS

FIGS. 7A, 7B, and 7C are side views illustrating a series of operations for the face to shift from the regular position to an inclined position.

DESCRIPTION OF THE PREFERRED EMBODIMENTS

Figure 1:
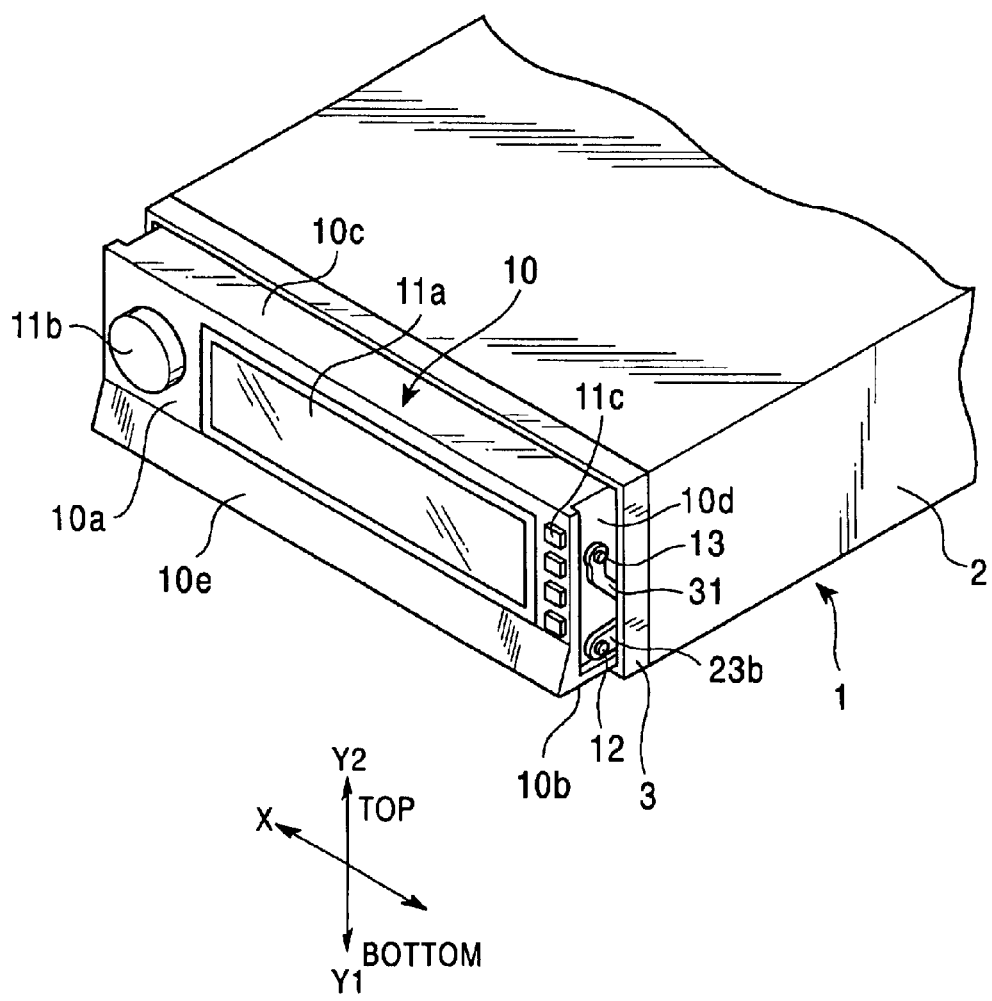
FIG. 1 is a perspective view of an in-car electronic device in a state wherein a face is in a regular position.
Figure 2:
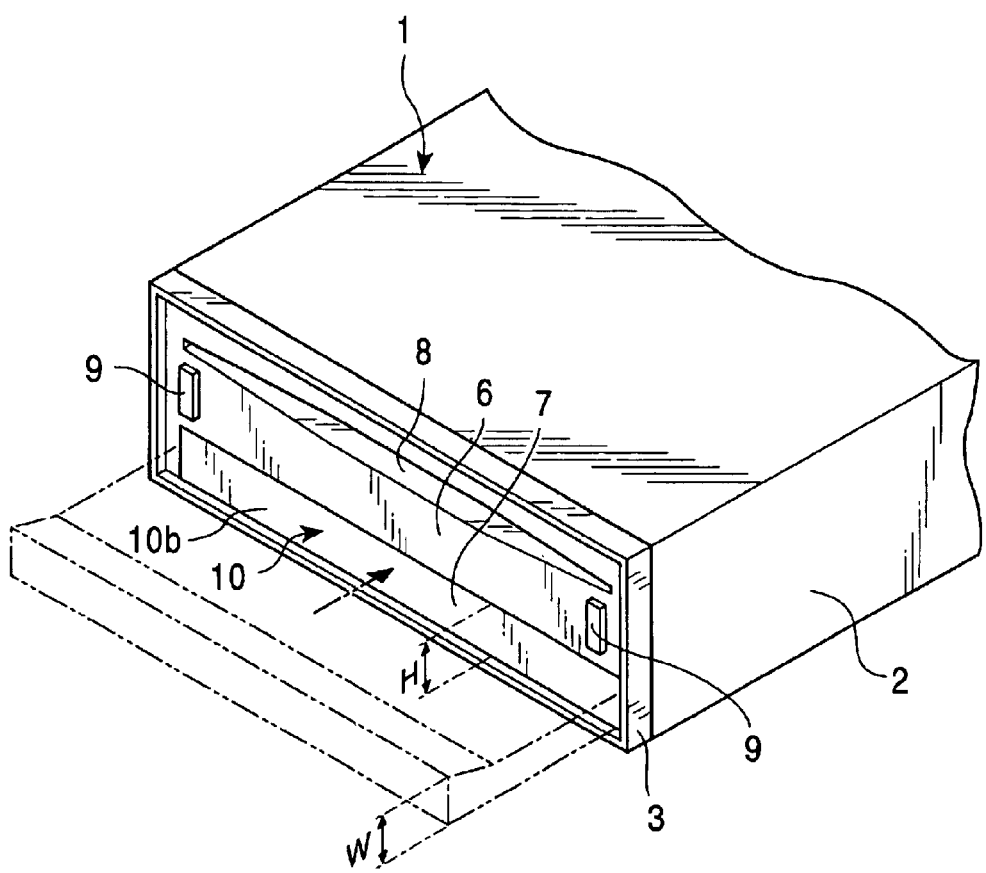
FIG. 2 is a perspective view of an in-car electronic device in a state wherein the face is in a retracted position.
Figure 3:
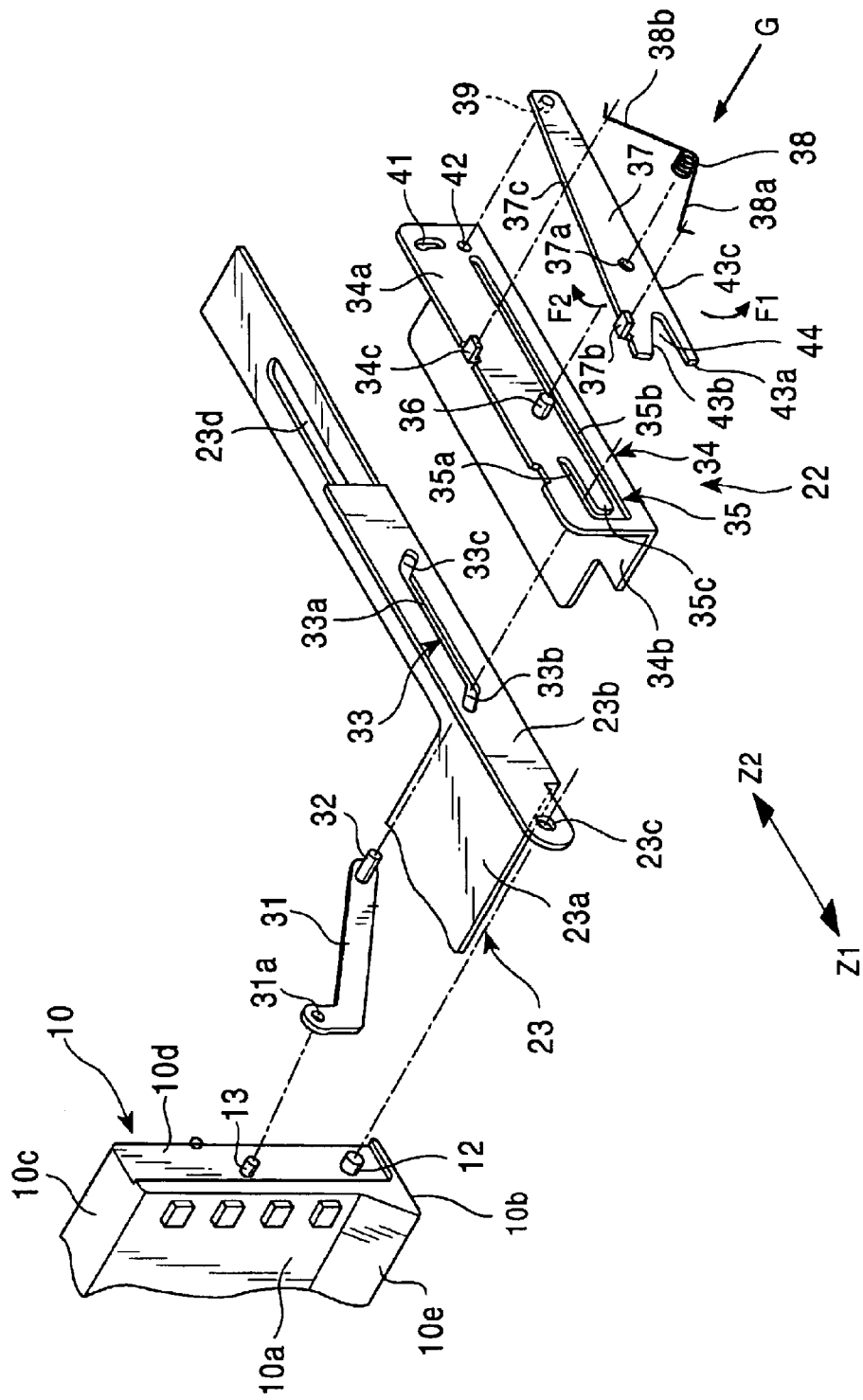
FIG. 3 is an exploded perspective view showing a structure of a switching means supporting the face.
Figure 4:
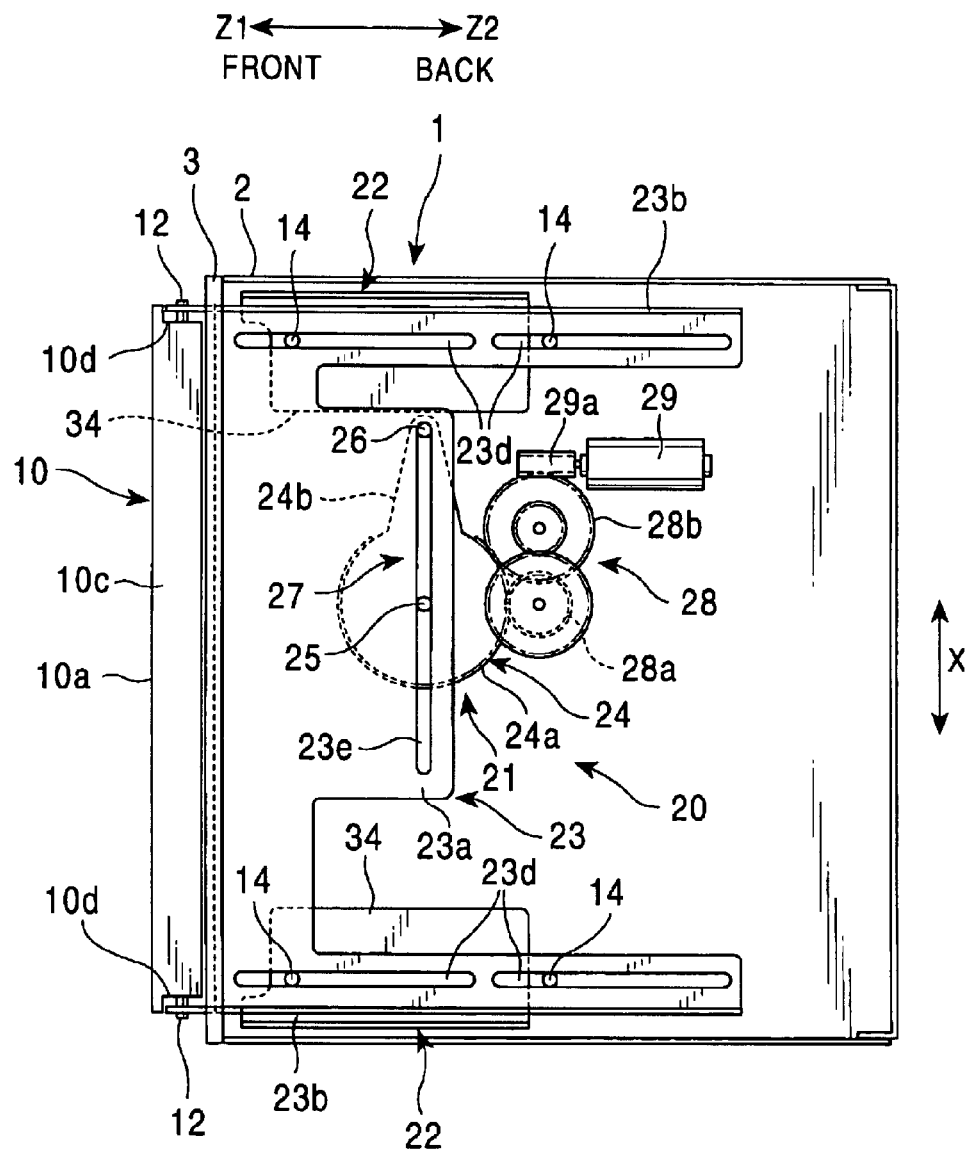
FIG. 4 is a top plan view showing a motion of a reciprocating drive means, with the face in a regular position.
Figure 5:
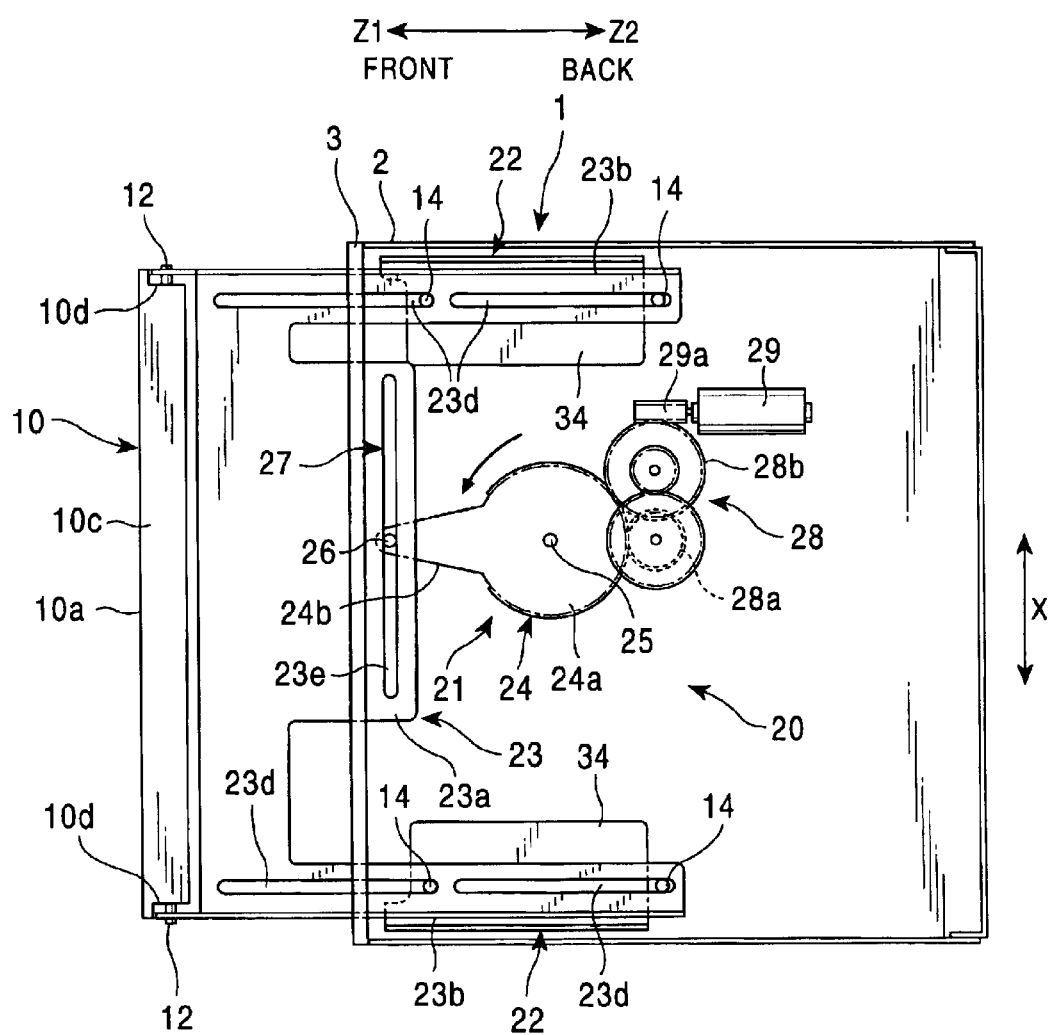
FIG. 5 is a top plan view showing a motion of the reciprocating drive means, with the face in a projected position.
Figure 6:
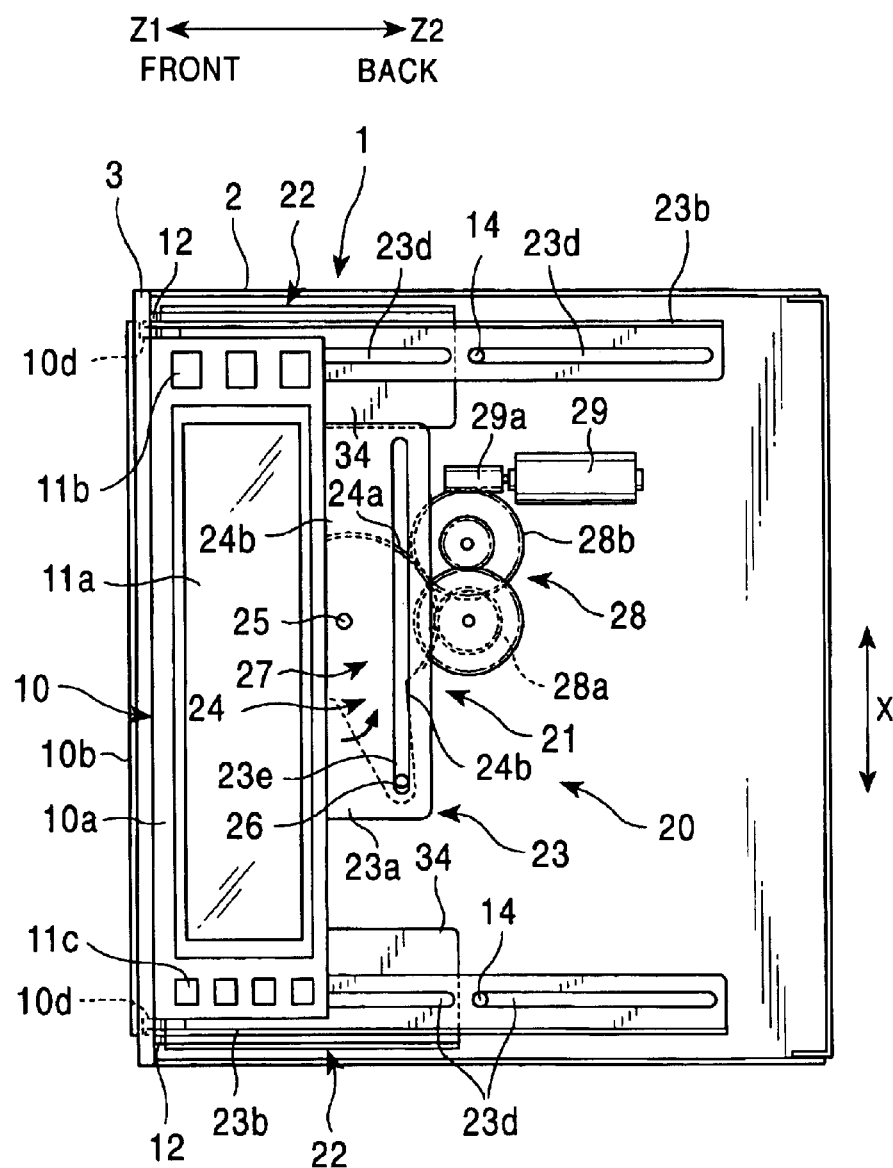
FIG. 6 is a top plan view showing a motion of the reciprocating drive means, with the face in a retracted position.

FIG. 1 is a perspective view of an in-car electronic device in a state wherein a face is in a regular position, FIG. 2 is a perspective view of an in-car electronic device in a state wherein the face is in a retracted position, FIG. 3 is an exploded perspective view showing a structure of a switching means supporting the face, FIGS. 4, 5, and 6 are top plan views illustrating motions of a reciprocating drive means of the position changing means when the face moves from its regular position to the retracted position, and FIG. 7A through FIG. 10B are fragmentary side views illustrating a series of operations when the face shifts from the regular position to the retracted position and back to the regular position.

A casing 1 of the in-car electronic device is constituted by an enclosure 2 and a front panel 3 fixed to a front surface of the enclosure 2. The enclosure 2, which is of a 1DIN size, is embedded in, for example, a dashboard or an instrument panel in a passenger compartment of a car. At this time, the front panel 3 is substantially flush with a surface of the dashboard or the instrument panel.

In this embodiment, direction Y1 is a bottom side or a first side, and direction Y2 is a top side or a second side. Direction X is a transverse direction, direction Z1 indicates front, and direction Z2 indicates back.

Referring to FIG. 7A, in the casing 1 and the enclosure 2, an accommodating area 4 for a face, which will be discussed later, is located at the bottom side or the Y1 side. The accommodating area 4 is an empty space. An installation area 5 for an internal device is located at the top side or the Y2 side. In the installation area 5, a variety of electronic circuits for an audio system, a screen display, a radio, etc. are installed. Furthermore, driving devices for recording media, such as CDs, DVDs, and MDs, are also installed in the installation area 5. In the embodiment shown in the drawing, a driving device for recording media is installed at the front or the Z1 side of the installation area 5.

Referring now to FIG. 2, the front surface of the front panel 3 constituting a part of the casing 1 has a face detaching surface 6. An opening 7 is formed at a position close to the bottom side, i.e. the first side or the Y1 side, of the face detaching surface 6. The opening 7 has a dimension H in a height direction and has a substantially rectangular opening extending laterally or in direction X. As shown in FIG. 7A, the opening 7 is in communication with the accommodating area 4 in the enclosure 2.

At a position close to the top side of the face detaching surface 6, i.e. the second side or the Y2 side, an insertion/ejection port 8 for recording media is formed. The insertion/ejection port 8 is formed at a position where a recording medium (e.g. disk) can be inserted in or ejected from a driving device for recording media that is installed in the installation area 5.

An almost entire surface of the face detaching surface 6 is composed primarily of a flat surface except the opening 7 and the insertion/ejection port 8, with a color of a front surface thereof being black or dark green. The color is identical to that of a face 10, which will be discussed hereinafter.

Cushions 9 and 9 are attached to the face detaching surface 6. When the face 10 is set on the face detaching surface 6, the cushions 9 and 9 lie, in a compressed state, between the face in the regular position and the face detaching surface 6 so as to prevent rattling of the face 10 caused by vibrations or the like of a car body. The cushions 9 and 9 are formed of a plate material, such as a rubber plate or a foamed resin plate, having elasticity and contractibility.

The face detaching surface 6 is provided with no display members and substantially has no functions for a display surface or a control surface. It is possible, however, to provide the face detaching surface 6 with a secret switch for actuating a motor driver that moves the face between the regular position and the retracted position.

Figure 11:
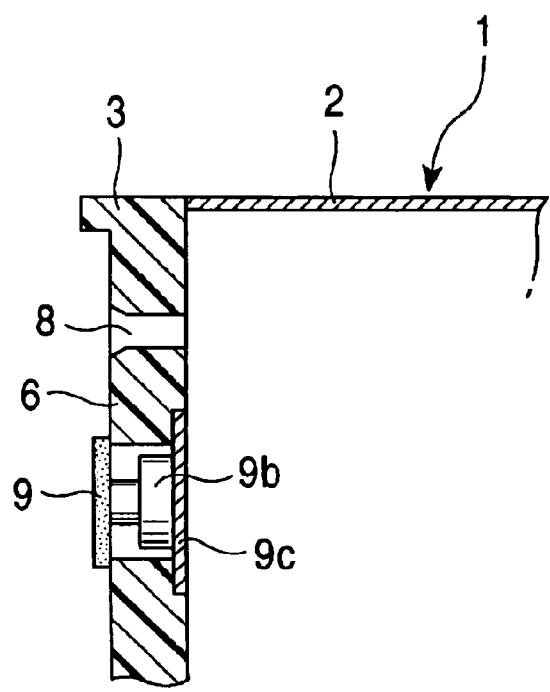
FIG. 11 is a fragmentary sectional view illustrating an example of a hidden switch provided on a face removal surface.
Figure 12:
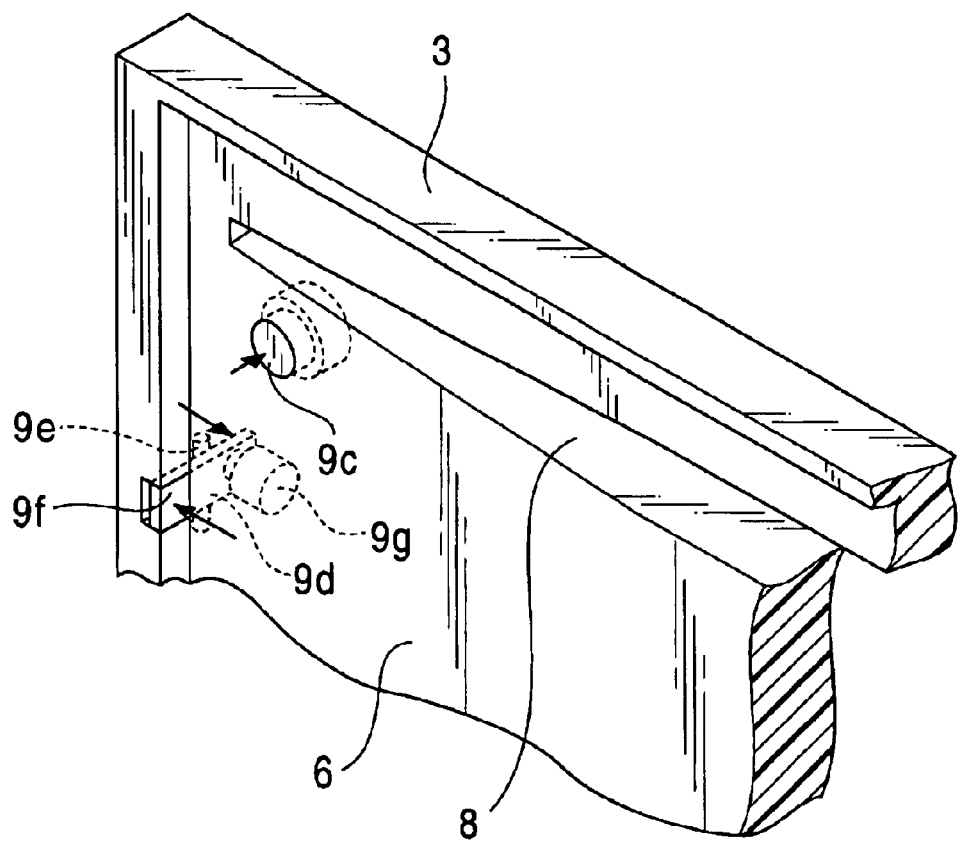
FIG. 12 is a fragmentary perspective view showing two examples of the hidden switch provided on the face removal surface.

FIGS. 11 and 12 show an example of the secret switch. Referring to FIG. 11, a tact switch 9b supported by a substrate 9a is provided in the front panel 3 at a portion covered by the cushions 9. The tact switch 9b is not operated when the surface of the cushion 9 is lightly pressed. When the surface of the cushion 9 is pressed hard, the cushion 9 is depressed deeply enough to press the tact switch 9b attached to the rear side thereof. With this arrangement, the cushion 9 functions as a switch operating part while functioning to suppress rattling of the face 10 at the same time. Alternatively, a thin tact switch or membrane switch with a surface thereof disguised to have the same color and texture as those of the cushion 9 may be attached to the face detaching surface 6 as the secret switch.

Alternatively, as shown in FIG. 12, only a pushbutton 9c of the tact switch may be exposed on the face detaching surface 6, and the surface of the pushbutton 9c may have the same color as that of the face detaching surface 6 to make it a secret switch. As a further alternative for making the secret switch, a seesaw plate 9d that circularly moves about an axis 9e is provided on a side of the front panel 3, and a part 9f of the seesaw plate 9d is exposed on a rib side wall on a side of the face detaching surface 6 so as to operate a tact switch 9g in the front panel 3 through the seesaw plate 9d.

Referring now to FIG. 1, a face 10 can be installed on the front surface of the front panel 3. The face 10 is substantially as large as the front surface, i.e. the face detaching surface 6, of the front panel 3.

A surface or the front surface of the face 10 provides a control surface 10a. A substantially entire surface of the control surface 10a provides a display and/or control surface. A display member 11a and control members 11b and 11c are arranged on the control surface 10a. The display member 11a is, for example, an equalizer display, a radio receiving frequency display, or a liquid crystal television, and displays received TV images or map images of a navigation system. In other words, the control surface 10a is not provided with an insertion/ejection port for recording media, so that the display member 11a with a large screen can be installed.

The control members 11b and 11c provided on the control surface 10a are used to control a driving device of recording media or a TV tuner accommodated in the enclosure 2, operates a driving device of recording media, a disk changer, or the like provided in a place other than the enclosure 2, or perform car navigating operation.

The control member 11b is a rotary type and used to control a rotary encoder (e.g. a rotary variable resistor or a contact type or optical type rotary switch). The control members 11c are key switches.

Referring now to FIG. 2, the face 10 is hidden by being accommodated in the casing 1 in the in-car electronic device. When the face 10 is brought out in the regular position in the front of the front panel 3 from the above retracted state as shown in FIG. 1, the display member 11a is enabled to perform display and the device is enabled to be operated through the control members 11b or 11c only if a predetermined password signal is entered.

The password number may be entered by pressing a predetermined combination of the key switch control members 11c or by a combination of a rotational direction and/or a rotational amount of the rotary control member 11b.

A CPU for controlling the entire device is provided in the enclosure 2. When the face 10 is shifted from the retracted position to the regular position, the CPU compares a password signal entered through the control members with a password signal stored in memory beforehand, and sets the electronic device in an operable state if the password signals coincide.

Figure 9A:
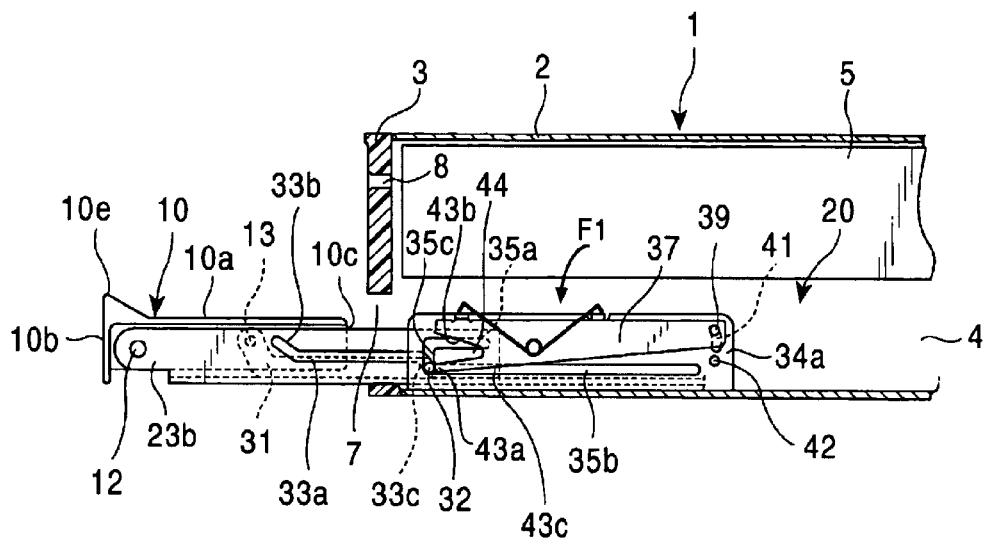
FIGS. 9A and 9B are side views illustrating a rotational motion when the face juts out from its retracted position.
Figure 9B:
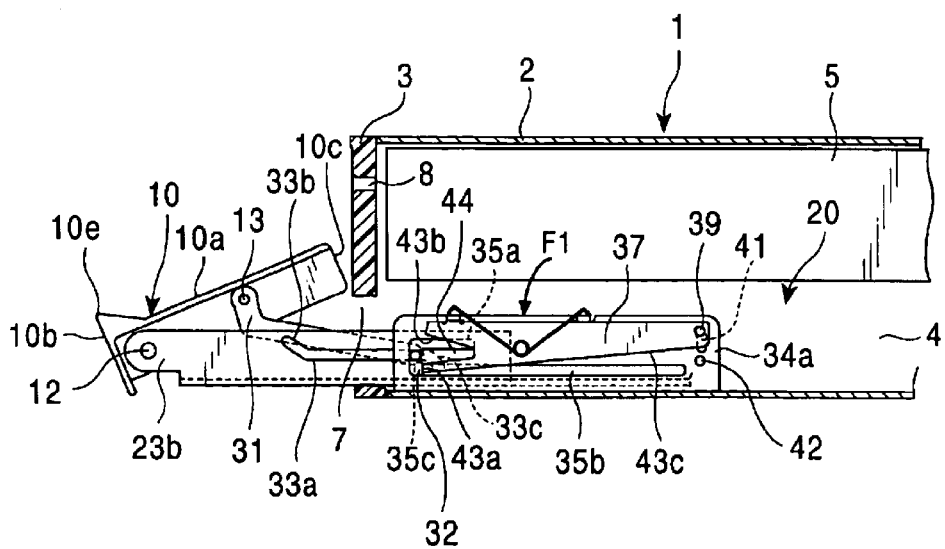

Alternatively, the projecting motion of the face 10 may be stopped when the face 10 in the retracted position shown in FIG. 2 reaches a horizontal position shown in FIG. 9A or a slant position shown in FIG. 9B, and the password signal may be entered, with the face set at these positions.

In the face 10, a projective portion 10e that projects forward or in direction Z1 is provided on an end portion 10b at the bottom side, i.e. the first side or the Y1 side, so that the thickness W of the end portion 10b is larger than the thickness of the remaining portion of the face 10. The thickness W is substantially identical to a longitudinal opening height H of the opening 7 formed in the face detaching surface 6 or slightly smaller than the opening height H. An end surface of the end portion 10b of the face 10 has the same or similar configuration as or to that of the opening 7, the configurations of both in this embodiment being rectangular.

Figure 8A:
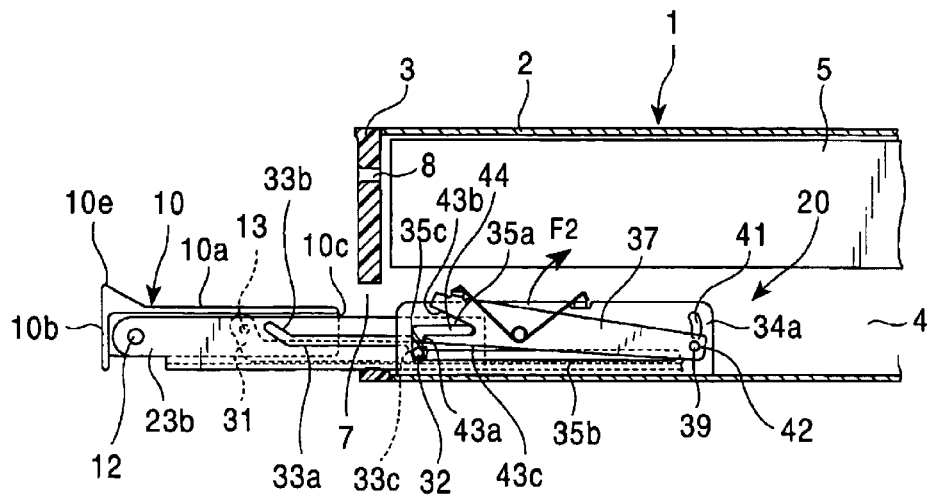
FIGS. 8A and 8B are side views illustrating operations for the face to shift from the projected position to the retracted position.
Figure 8B:
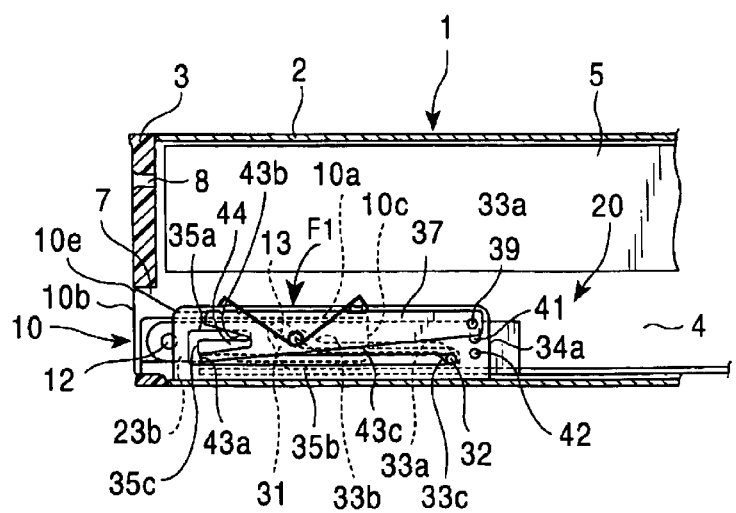

Hence, as shown in FIG. 2 and FIG. 8B, when the face 10 has been retracted through the opening 7 into the accommodating area 4 in the enclosure 2, the opening 7 is closed by the end portion 10b of the face 10, leaving substantially no gap between the end portion 10b and the opening 7. At this time, a surface or an end surface of the end portion 10b of the face 10 is substantially flush with the face detaching surface 6. Hence, in the retracted position shown in FIG. 2, it is possible to make it look as if the face 10 had been removed from the face detaching surface 6.

Furthermore, as shown in FIG. 7C, a height difference T between the projective portion 10e projecting forward in the end portion 10b of the face 10 and the control surface 10a is set to a larger value than a height of projection of the display member 11a and control members 11b and 11c, which are provided on the control surface 10a, from the control surface 10a. More specifically, the thickness W of the end portion 10b is set so that it is equal to or larger than a sum of a thickness of a portion of the face 10, wherein the projective portion 10e is not provided, and a height of projection of the control members 11b and 11c and the display member 11a from the control surface 10a.

Therefore, as shown in FIG. 8A and 8B, when the face 10 in a horizontal position is retracted toward the rear or direction Z2 from an upper edge 10c or the end of the second side, the display member 11a and the control members 11b and 11c do not come in contact with edges of the opening 7. In addition, upon completion of the retraction, no extra gap is produced between the end portion 10b of the face 10 and the edges of the opening 7.

When the face 10 in the regular position where it covers the face detaching surface 6 as shown in FIG. 7A is retracted, the face 10 moves forward by a predetermined distance without inclining as illustrated in FIG. 7B, then the end portion 10b moves forward, during which the upper edge 10c circularly moves to the bottom side or the first side. With the control surface 10a of the face 10 set substantially perpendicular to the face detaching surface 6 as shown in FIG. 8A, the face 10 is retracted in the accommodating area 4 in the enclosure 2. When the face 10 in the retracted position shifts back to the regular position, a procedure reversed from the one illustrated in FIG. 9 through FIG. 10 will be followed.

A structure and an operation of a position changing means 20 for shifting the face 10 between the regular position and the retracted position will now be described.

The position changing means is constructed mainly of a reciprocating drive means or a reciprocating driving mechanism 21 and a switching means or a shifting mechanism 22 for shifting the face between the regular position and the retracted position. FIG. 4 through FIG. 6 primarily show a structure and an operation of the reciprocating drive means 21; FIG. 3 primarily shows a structure of the switching means 22; and FIG. 7 and the following figures illustrate an operation of the switching means 22.

As shown in FIG. 3 and FIG. 4, support pins 12 and 12 are fixed to both lateral side surfaces 10d and 10d at the bottom end or the first side end portion 10b in the face 10. In the reciprocating drive means 21, a reciprocating member 23 is provided at the bottom of the casing 1 such that it is free to reciprocate in a longitudinal direction (Z1–Z2 direction). The reciprocating member 23 is composed of a bottom plate 23a and bent pieces 23b and 23b that are formed by integrally bending a single metal plate such that the pieces 23b and 23b rise upward from the bottom plate 23a at the right and left edges thereof.

Distal ends of the bent pieces 23b and 23b have support holes 23c and 23c. The support pins 12 and 12 provided on the two side surfaces 10d and 10d at the end portion 10b of the face 10 are rotatably supported in the support holes 23c and 23c. In other words, the bottom end or the end portion on the first side of the face 10 is rotatably supported by the reciprocating member 23.

The bottom plate 23a of the reciprocating member 23 is provided with four slots 23d formed in the longitudinal direction (Z1–Z2 direction). Guide pins 14 provided by being fixed on the bottom plate of the enclosure 2 are inserted in the slots 23d. As a result, the reciprocating member 23 is able to linearly reciprocate in the longitudinal direction.

Referring to FIG. 4, a rotating member 24 is rotatably supported on a bottom plate of the enclosure 2 by a central axis 25 fixed to the bottom plate. A predetermined arc shaped module teeth 24a is formed on a circumference of the rotating member 24, the central axis 25 being the center thereof. Thus, the rotating member 24 constitutes a partial gear assembly.

A pinion gear 28a in an output stage of a reduction gear train 28 engages the teeth 24a. A worm gear 29a fixed to an output shaft of a motor 29 engages a gear 28b in an input stage of the reduction gear train 28. In other words, the reduction gear train 28 and the motor 29 make up the motor driver that reciprocates the rotating member 24.

An arm 24b that circularly moves is integrally formed with the rotating member 24 at a portion where the teeth 24a are not provided. A sliding pin 26 is fixed to a tip of the arm 24b. A slot 23e that linearly extends in a lateral direction is formed in the bottom plate 23a of the reciprocating member 23. The sliding pin 26 is slidably inserted in the slot 23e. The arm 24b, the sliding pin 26, and the slot 23e make up a motion converting means 27 that converts a rotary motion of the rotating member 24 into a reciprocating motion of the reciprocating member 23.

Referring back to FIG. 4, when the rotating member 24 circularly moves fully clockwise, the reciprocating member 23 is drawn back or in direction Z2. At this time, the face 10 is in the regular position where it covers the front surface of the face detaching surface 6 as shown in FIG. 7A. FIG. 5 shows a state wherein the rotating member 24 has circularly moved from a state shown in FIG. 4 by substantially 90 degrees counterclockwise (substantially to a midpoint of a rotational range of the rotating member 24). At this time, the reciprocating member 23 fully projects forward in direction Z1. This means that the face 10 is in the middle of retraction as shown in FIG. 8A. FIG. 6 illustrates a state wherein the rotating member 24 has further moved counterclockwise to a final point. At this time, the face 10 has completely been retracted in the casing 1 as shown in FIG. 8B.

When the rotating member 24 circularly moves clockwise from the state shown in FIG. 6 to a state illustrated in FIG. 4, the face 10 in the retracted position projects forward to the front of the casing 1, rises, and shifts to the regular position.

As shown in FIG. 3, the two side surfaces 10d and 10d of the face 10 are provided with support pins 13 fixed at positions closer to the upper edge 10c than the support pin 12. FIG. 3 shows a position changing arm 31 serving as a position changing member. A hole 31a is formed in one end of the position changing arm 31, and the support pin 13 is rotatably coupled into the hole 31a. A control pin 32 is fixed to the other end of the position changing arm 31.

Guiding sections 33 basically composed of slots are formed in both bent pieces 23b and 23b of the reciprocating member 23. Each of the guiding sections 33 is constituted by a linear guiding portion 33a horizontally extending in a longitudinal direction (Z1–Z2), an upward slant guiding portion 33b extending aslant upward to the front of the linear guiding portion 33a (in direction Z1), and a downward slant guiding portion 33c extending aslant downward to the rear of the linear guiding portion 33a (in direction Z2).

A pair of the position changing arm 31 and the control pin 32 is provided on the right and left sides of the face 10, the control pins 32 being slidably inserted in the guide portions 33.

FIG. 4 does not show details of the structure of the switching means 22. The switching means 22 are provided on both sides in a lateral direction or direction X to correspond to the pair of the position changing arms 31. The following description, however, will refer to the switching means 22 provided on only one side shown in FIG. 3. The structure of the switching means provided on the other side is symmetrical to the one shown in FIG. 3 in direction X.

The switching means 22 is provided with a switching member 34. The switching member 34 is formed by bending a metal plate into an L shape, and composed of a control plate 34a vertically extending in a longitudinal direction and a fixed plate 34b horizontally extending. As shown in FIG. 4, the fixed plate 34b is fixed to the bottom plate of the enclosure 2.

The control plate 34a is provided with a shifting path 35 formed by a slot. The control pin 32 inserted in the guiding section 33 of the bent piece 23b is slidably inserted in the shifting path 35.

The shifting path 35 is provided with a regular position path 35a shortly extending in a longitudinal direction or direction Z and a retracted position path 35b that is located under the regular position path 35a, extends also to the rear in parallel to the path 35a, and is sufficiently longer than the regular position path 35a. Front ends of the regular position path 35a and the retracted position path 35b are linked by a switching path 35c that vertically extends in the longitudinal direction.

A selecting member 37 is provided on an outer side the control plate 34a of the switching member 34. A hole 37a formed in the selecting member 37 is rolatably supported by a support shaft 36 fixed to the control plate 34a. A wound portion of a torsion spring 38 is externally inserted in a tip of the support shaft 36 inserted in the hole 37a of the selecting member 37. The wound portion of the torsion spring 38 is retained on the support shaft 36 by a retaining member (not shown) provided on a distal end of the support shaft 36.

One urging arm 38a of the torsion spring 38 engages a spring hook 37b formed on the selecting member 37, while the other urging arm 38b of the torsion spring 38 engages a spring hook 34c formed on the upper edge of the control plate 34a by bending. The selecting member 37 is urged counterclockwise or in direction F1, with the support shaft 36 acting as a support point, by the urging arm 38a of the torsion spring 38. The circular motion of the selecting member 37 in the counterclockwise direction is restricted by an upper side 37c of the selecting member 37 coming into contact with the spring hook 34c.

The wound portion of the torsion spring 38 functions as a compression spring. The wound portion is provided in the compressed state between the selecting member 37 and the retaining member at the distal end of the support shaft 36 to thereby always elastically press the selecting member 37 against the control plate 34a in direction G.

A trailing end of the selecting member 37 is provided with a small protuberance 39 jutting out toward the control plate 34a. The small protuberance 39 is formed by embossing or the like so that it projects from the selecting member 37.

The control plate 34a has an arc guiding portion 41 formed in a slot along an arc trajectory around the support shaft 36, and a round locking portion 42 that is provided under the arc guiding portion 41 and formed on an extension line of the arc trajectory. When the small protuberance 39 is in the arc guiding portion 41, the selecting member 37 is allowed to circularly move within a range of the length of the arc guiding portion 41. When the small protuberance 39 moves beyond the arc guiding portion 41 until it is fitted in the locking portion 42, the small protuberance 39 is pressed against the locking portion 42 by an urging force of the wound portion of the torsion spring 38 in direction G. Thus, the small protuberance 39 is retained and locked in the locking portion 42 to thereby lightly lock the selecting member 37.

A front end of the selecting member 37 is forked by a groove 44. A lower branch extends forward or in direction Z1. A distal end of the lower branch provides a selection restricting portion 43a. An upper branch of the groove 44 formed above the selection restricting portion 43a provides a first sliding portion 43b. A lower side of the selecting member 37 located below the selection restricting portion 43a provides a second sliding portion 43c.

A position control operation of the face 10 will now be described.

In the regular position shown in FIG. 1, the control surface 10a of the face 10 is exposed on the front surface of the casing 1. In this state, the display member 11a of the control surface 10a provides, for example, an equalizer display, a radio receiving frequency display, or displays received TV images or map images of a navigation system. The control members 11b and 11c are used to select a radio tuner band or a TV channel, operate the car navigation system or a disk changer, or adjust sound volume or sound quality.

FIG. 4 and FIG. 7A illustrate an operating state of the position changing means 20 when the face 10 is in the regular position.

Referring to FIG. 4, in the reciprocating drive means 21, the rotating member 24 has been circularly moved clockwise by the motor 29 and stopped at the illustrated position. The reciprocating member 23 has been drawn back or in direction Z2 and stopped at the illustrated position.

At this time, as shown in FIG. 7A, the control pin 32 provided on a proximal end of the position changing arm 31 rotatably coupled to a side surface 10d of the face 10 is located at a distal end of the upward slant guiding portion 33b of the guiding section 33 formed on the bent piece 23b of the reciprocating member 23. The control pin 32 is located at a side end adjacent to a Z2 side of the upper regular position path 35a of the shifting path 35 formed in the control plate 34a. The control pin 32 slides the first sliding portion 43b of the selecting member 37 and fits itself in the groove 44. Hence, the selecting member 37 is circularly moved clockwise or in direction F2, and the small protuberance 39 provided at the rear end of the selecting member 37 fits in the locking portion 42 formed in the control plate 34a, thereby lightly locking the selecting member 37 in a position where it has circularly moved clockwise or in direction F2.

To move the face 10 from the regular position to the retracted position, a retraction control button or the like provided on the control surface 10a of the face 10 is pressed. This causes the rotating member 24 to be driven counterclockwise by the motor 29 shown in FIG. 4. When the shift from the regular position to the retracted position is performed continuously, the rotating member 24 goes through a state shown in FIG. 4 and a state shown in FIG. 5, then circularly moves fully counterclockwise as shown in FIG. 6, with the motor 29 stopping at that point.

In the process illustrated in FIGS. 4, 5, and 6, the reciprocating member 23 is reciprocated by the motion converting means 27 constructed by the arm 24b of the rotating member 24, the sliding pin 26 fixed thereto, and the slot 23e formed in the reciprocating member 23. FIG. 5 shows the reciprocating member 23 when it has fully projected forward or in direction Z1. While the reciprocating member 23 is projecting from the state shown in FIG. 4 to the state shown in FIG. 5, the face 10 shifts from the position shown in FIG. 7A to the position shown in FIG. 8A. The rotating member 24 further moves from the position shown in FIG. 5 to the position shown in FIG. 6. When the reciprocating member 23 is drawn back, the face 10 shifts from the position shown in FIG. 8A to the retracted position shown in FIG. 8B.

During a first process in which the reciprocating member 23 juts out in direction Z1 from the regular position shown in FIG. 4 and FIG. 7A, the reciprocating member 23 linearly advances in direction Z1, and the control pin 32 provided in the position changing arm 31 linearly advances in direction Z1 in the regular position path 35a of the control plate 34a constituting the switching means 22. Thus, the face 10 advances in direction Z1 parallel to itself without inclining to reach the position shown in FIG. 7B.

Referring now to FIG. 7B, the control pin 32 reaches a front end of the regular position path 35a, and the control pin 32 can no longer advance in direction Z1. Hence, as the reciprocating member 23 further advances in direction Z1, the support pin 12 supporting the face 10 advances. The support pin 13 can no longer advance, so that the top end, i.e. the end on the second side, of the face 10 circularly moves downward, i.e. toward the first side as the reciprocating member 23 advances.

FIG. 7C shows the face 10 in the middle of its circular movement. In this state, the control pin 32 slides in the linear guiding portion 33a formed in the reciprocating member 23, and the control pin 32 is positioned in the switching path 35c of the shifting path 35 of the control plate 34a. In the process from the state shown in FIG. 7C to the state shown in FIG. 8A, the control pin 32 moves down along the downward slant guiding portion 33c as the reciprocating member 23 advances. Therefore, in FIG. 8A, the control pin 32 is positioned at a front end of the retracted position path 35b of the control plate 34a. In the state shown in FIG. 8A wherein the reciprocating member 23 is in a most advanced position, the face 10 is set in the horizontal position where the control surface 10a is oriented vertically with respect to the face detaching surface 6.

When the reciprocating member 23 recedes in direction Z2 from its position shown in FIG. 8A, the control pin 32 moves toward the rear, i.e. in direction Z2, along the retracted position path 35b of the control plate 34a. Thus, the face 10 is retracted in the casing 1 and the accommodating area 4 in the enclosure 2 while maintaining its horizontal position. In the retracted position shown in FIG. 8B, an end surface of the end portion 10b of the face 10 becomes substantially flush with the face detaching surface 6.

In the process from the state shown in FIG. 8A to the state shown in FIG. 8B, the control pin 32 moves backward in the retracted position path 35b of the shifting path 35 of the control plate 34a. At this time, the control pin 32 comes into contact with and slides the second sliding portion 43c, which is the bottom side of the selecting member 37. Thus, the selecting member 37 is turned counterclockwise or in direction F1, causing the small protuberance 39 provided at the rear end of the selecting member 37 to come off the locking portion 42 of the control plate 34a and to enter the arc guiding portion 41. This unlocks the selecting member 37, allowing the selecting member 37 to turn about the support shaft 36 within the moving range in the arc guiding portion 41. At this time, however, the selecting member 37 is always elastically urged counterclockwise or in direction F1 by the torsion spring 38.

In the above state, the face 10 can be stopped when it reaches the inclined position shown in FIG. 7C or when it reaches the horizontal position shown in FIG. 8A by detecting that the rotating member 24 has reached a predetermined rotational position or that the reciprocating member 23 has reached a predetermined position and by stopping the motor 29 at these positions. In the state shown in FIG. 7C, the control surface 10a of the face 10 is oriented aslant upward, allowing the display member 11a provided on the control surface 10a to be seen, or the control members 11b and 11c to be operated.

In the state illustrated in FIG. 7C, the face detaching surface 6 is exposed at a position adjacent to the upper edge 10c of the face 10 stopped in the inclined position, the insertion/ejection port 8 for recording media being exposed at the position adjacent to the upper edge 10c. Thus, a recording medium, such as a disk, can be inserted or ejected through the insertion/ejection port 8 at an upper position of the face 10.

Referring to FIG. 8A, stopping the face 10 at its projected, horizontal position enables a user to see and operate the control surface 10a, which faces upward, of the face 10.

Referring back to FIG. 2, when the face 10 has been accommodated in the casing 1, the end portion 10b of the face 10 is substantially flush with the face detaching surface 6. Accordingly, the entire face detaching surface 6 looks as if it were composed of a single surface, making it look as if the face 10 had been removed from the face detaching surface 6.

To project the face in the retracted position to bring it back to its regular position, the end portion 10b of the face 10 is pushed to activate the switch via the face, or the secret switch shown in FIG. 11 or FIG. 12 is operated, with the face being in the retracted position as shown in FIG. 6 and FIG. 8B.

When the switch mentioned above is pressed, the motor 29 is started, and the rotating member 24 starts to turn clockwise. When the rotating member 24 reaches a position shown in FIG. 5, the reciprocating member 23 is in its most advanced position in direction Z1. In this process, the control pin 32 advances in direction Z1 in the retracted position path 35b of the control plate 34a as illustrated in FIG. 8B through FIG. 9A. When the control pin 32 moves forward, it comes into contact with the second sliding portion 43c of the selecting member 37, causing the selecting member 37 to turn once clockwise or in direction F2. The turning motion of the selecting member 37 is, however, limited by the range of the arc guiding portion 41 in the control plate 34a in which the small protuberance 39 is allowed to move. Therefore, as shown in FIG. 9A, when the control pin 32 moves to the front end of the retracted position path 35b, causing the control pin 32 to come off the selecting member 37, the selecting member 37 is turned counterclockwise or in direction F1 by the torsion spring 38, and a front end of the retracted position path 35b is closed by the selection restricting portion 43a at the front end of the selecting member 37.

When the rotating member 24 further turns clockwise from the state shown in FIG. 5, the reciprocating member 23 moves to the rear or in direction Z2. At this time, the control pin 32 is blocked by the selection restricting portion 43a of the selecting member 37 from moving back into the retracted position path 35b as shown in FIG. 9A. Thus, the control pin 32 is lifted by the downward slant guiding portion 33c formed on the reciprocating member 23 that moves toward the back, and moved to the switching path 35c of the shifting path 35 provided in the control plate 34a as shown in FIG. 9B. Thus, as the reciprocating member 23 recedes, the linear guiding portion 33a of the reciprocating member 23 slides the control pin 32.

When the reciprocating member 23 recedes, the control pin 32 is retained in the switching path 35c, and the support pin 12 serving as a coupling point of the reciprocating member 23 and the face 10 moves backward, causing the upper edge (the end on the second side) 10c of the face 10 to be moved upward. As a result, the face 10 is inclined and turned counterclockwise as illustrated in FIG. 9B. When the face 10 reaches the position illustrated in FIG. 10A, the control pin 32 is lifted by the upward slant guiding portion 33b provided in the reciprocating member 23, and the face 10 is set in the vertical position where the control surface 10a is parallel to the face detaching surface 6.

Figure 10A:
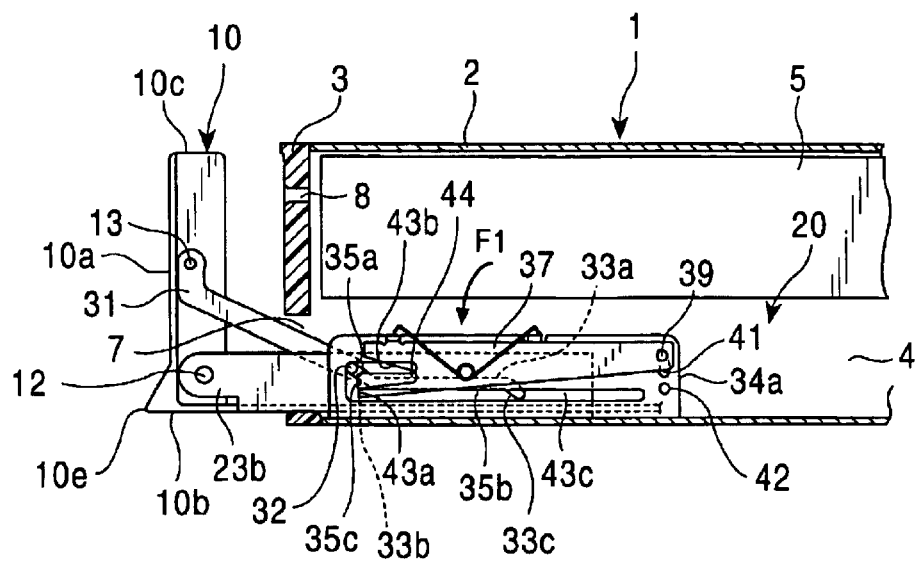
FIGS. 10A and 10B are side views illustrating a motion of the face when it shifts from a vertical position back to its regular position.
Figure 10B:
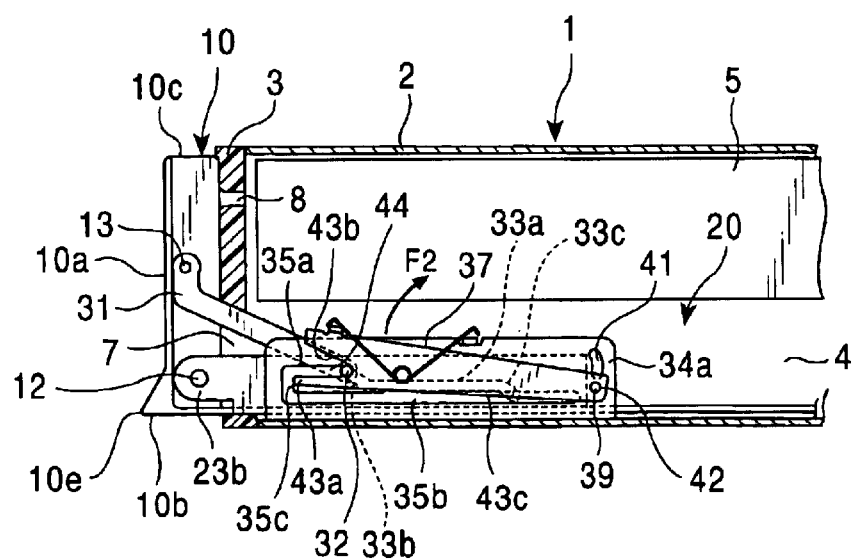

As the reciprocating member 23 further recedes, the control pin 32 moves backward in the regular position path 35a of the control plate 34a, and the face 10 is set in the regular position where it covers the face detaching surface 6 as shown in FIGS. 10A and 10B. By the time the face 10 reaches the position shown in FIG. 10B, the control pin 32 enters the groove 44 of the selecting member 37 and comes into contact with the first sliding portion 43b. As the control pin 32 moves to the rear end of the groove 44, the selecting member 37 turns clockwise or in direction F2, and the small protuberance 39 leaves the arc guiding portion 41 and fits in the locking portion 42 to thereby lightly lock the selecting member 37.

Thus, the selecting member 37 is free to circularly move within the range defined by the arc guiding portion 41, urged by the torsion spring 38 counterclockwise or in direction F1, and lightly locked by the locking portion 42 when it turns clockwise. The lightly locked state enables to control pin 32 to enter the retracted position path 35b of the shifting path 35 of the control plate 34a during the process illustrated in FIG. 7A through FIG. 8A. During the process shown in FIG. 8B through FIG. 9B, the control pin 32 is restricted by the selection restricting portion 43a of the selecting member 37 that turns counterclockwise to thereby prevent the control pin 32 from moving back into the retracted position path 35b. Receding motion of the reciprocating member 23 permits the face 10 to be set upright.

When the face 10 has been shifted from the retracted position shown in FIG. 2 to the regular position shown in FIG. 1, a password signal is entered through the control member 11b or 11c as previously mentioned.

Figure 13A:
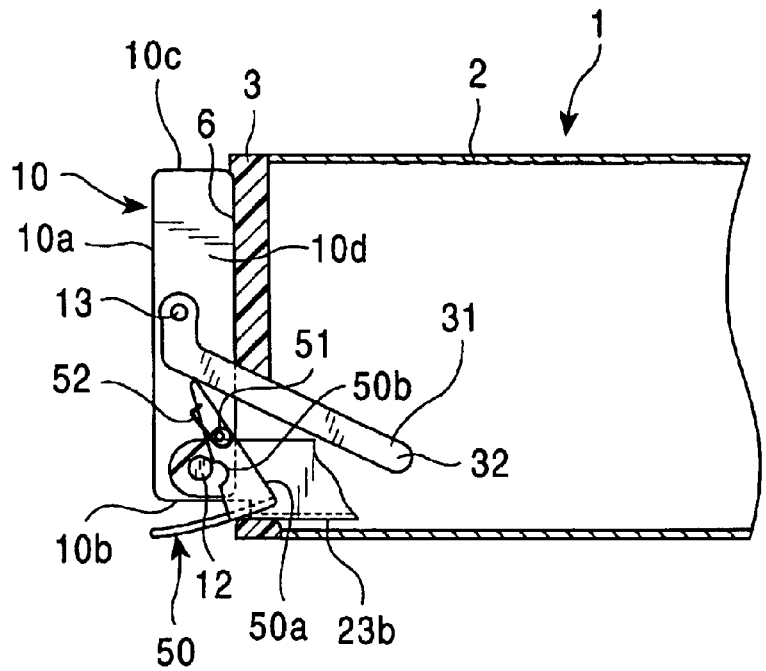
FIGS. 13A and 13B are fragmentary sectional views illustrating steps of an operation of a cover that closes an opening in a second embodiment of the present invention.
Figure 13B:
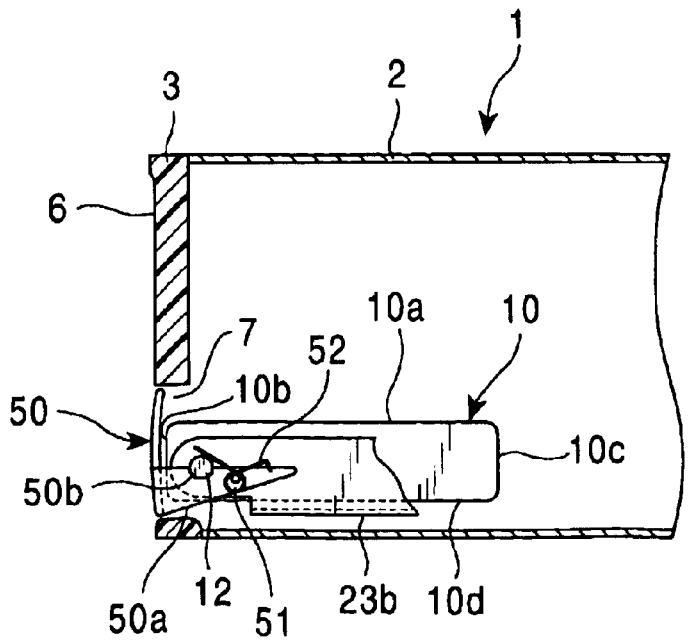

FIGS. 13A and 13B illustrate a second embodiment of the present invention.

In the second embodiment, the projected portion 10e is not provided on the end portion 10b of the face 10 shown in FIG. 1 or FIG. 7A. Instead, the face 10 has substantially the same thickness measured from an end portion 10b to an upper edge 10c.

A cover 50 is provided at the end portion 10b of the face 10. The cover 50 is formed so that it is slightly smaller than an opening 7 and has a similar configuration to that of the opening 7 so as to be able to cover the opening 7 formed in a face detaching surface 6. Cover arms 50a are formed by integrally bending them on right and left sides of the cover 50. The cover arms 50a are rotatably supported by pins 51 on two side surfaces 10d and 10d of the face 10.

The pins 50 are provided with torsion springs 52 serving as cover urging members. The torsion springs 52 urge the cover arms 50a clockwise, with the pins 51 being the support points. As shown in FIG. 13B, the clockwise circular motion of the cover arms 50a is restricted when recesses 50b formed in the cover arms 50a come in contact with the support pins 12.

FIG. 13A shows the face 10 in a regular position where the face 10 is installed on the front of the face detaching surface 6. At this time, distal ends of the cover arms 50a have been pushed forward by position changing arms 31, and the cover 50 located below the end portion 10b of the face 10 has been turned counterclockwise. Hence, the cover 50 does not jut out at the end portion 10b of the face 10. In other words, a distal end of the cover 50 has been receded in an enclosure 2 from a control surface 10a of the face 10, and no protuberance is formed at the bottom of the face 10.

When the face 10 is accommodated in the casing 1 by a motion of a position changing means 20 shown in FIG. 7 and the subsequent drawings, the face 10 is set in a retracted position shown in FIG. 13B.

At this time, the position changing arms 31 leave the cover arms 50a, so that the cover arms 50a are turned clockwise by the torsion springs 52 and stabilized in contact with the support pins 12.

In the retracted position, the opening 7 is covered by the cover 50. When the cover 50 covers the opening 7, a surface of the cover 50 becomes substantially flush with the face detaching surface 6. The surface of the cover 50 and the face detaching surface 6 share the same color. Thus, it is possible to make it look as if the face 10 had been removed from the face detaching surface 6.

Figure 14A:
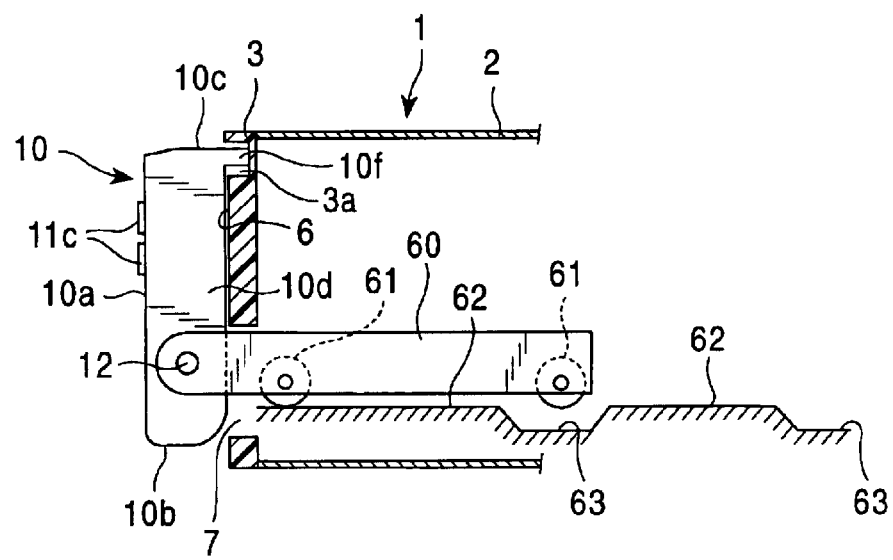
FIGS. 14A and 14b are fragmentary sectional views illustrating steps of an operation in a third embodiment.
Figure 14B:
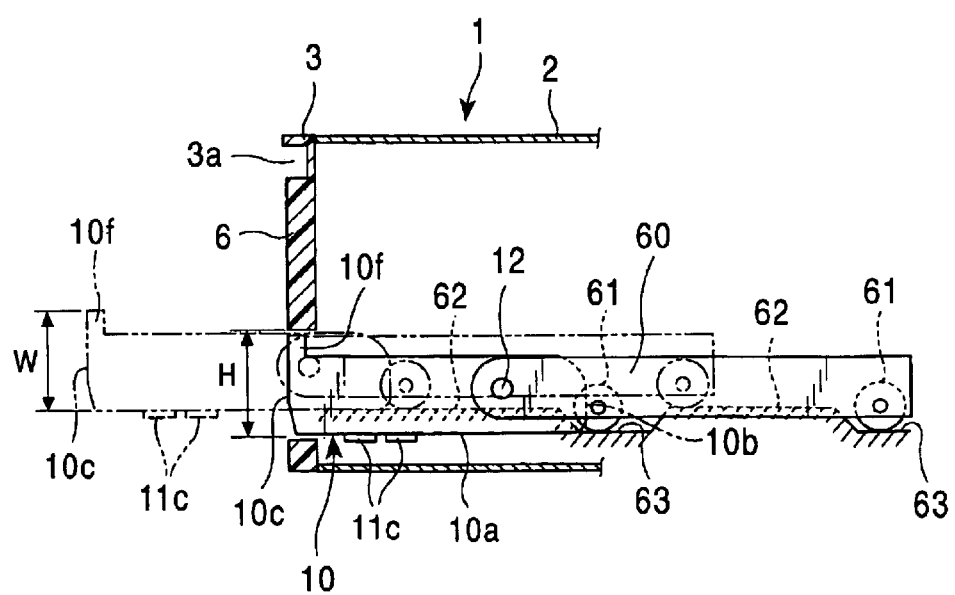

FIGS. 14A and 14B show a third embodiment of the present invention.

In this embodiment, the projecting portion 10e shown in FIG. 7 is not formed on an end portion 10b of a face 10. Instead, a projecting portion 10f that projects toward a casing 1 or projects from a rear surface of the face 10 is formed on an upper end 10c of the face 10. Furthermore, a face detaching surface 6 of the front panel 3 is provided with a recess 3a in which the projecting portion 10f fits in when the face 10 is in a regular position.

As shown in FIG. 14B, due to the presence of the projecting portion 10f, the thickness of the upper end 10c, denoted by W, of the face 10 is identical to a width of a bottom end of the face 10 shown in FIG. 7C. A width W of the upper end 10c of the face 10 in the embodiment of FIG. 14 is equal to or more than a sum of a thickness of the face 10 at a portion where the projecting portion 10f is not formed and an amount of projection of a display member or a control member 11c from a control surface 10a of the face 10. The aforesaid thickness W is set so that it is substantially equal to or slightly smaller than an opening height H of an opening 7 formed in the face detaching surface 6.

A support pin 12 provided on a side surface 10d of the face 10 is rotatably coupled to a reciprocating member 60. The reciprocating member 60 may be driven by a reciprocating drive means 21 having the motor driver shown in FIG. 4, or driven manually.

Guide rollers 61 and 61 are rotatably installed on the reciprocating member 60. A guiding surface 62 for guiding the guide rollers 61 and 61 is provided in the casing 1. The guiding surface 62 is provided with descending guide portions 63 and 63 at two locations thereof.

To retract the face 10 in a regular position shown in FIG. 14A into the casing 1, the face 10 in a vertical position is turned forward about the support pin 12 by hand or by using power of a motor or an inclining mechanism so as to set the face 10 in a horizontal position.

Thereafter, the reciprocating member 60 is drawn into the casing 1 by power of a motor driver or by a pushing force applied by a hand. At least one of the guide rollers 61 and 61 moves along the guiding surface 62. At this time, as indicated by a dashed line in FIG. 14B, the face 10 is first lifted slightly, then moved backward into the casing 1. In the retracting process, the control surface 10a of the face 10 faces downward, but the face 10 recedes in the slightly lifted position, so that the control member 11c or the display member projecting downward from the control surface 10a does not come into contact with a bottom edge of the opening 7.

When the face 10 recedes to a point immediately before completion of the retraction, or to a point at which the display member or the control member has passed the opening 7, the guide rollers 61 and 61 drop into the descending guide portions 63 and 63. Hence, as indicated by a solid line in FIG. 14B, the face 10 in the horizontal position descends until the bottom end 10c of the face 10 becomes flush with the opening 7, and the bottom end 10c of the face 10 covers the opening 7. In this case also, the bottom end 10c of the face 10 is flush with the face detaching surface 6, and the bottom end 10c and the face detaching surface 6 have the same color.

In the process wherein the face 10 in the retracted position is shifted back to the regular position, immediately after the face 10 advances a little and the projection portion 10f leaves the opening 7, the face 10 is lifted as indicated by the dashed line in FIG. 14B. Thereafter, the face 10 advances in such a manner that the display member 11c facing downward does not come into contact with the bottom edge of the opening 7. Thus, the face 10 is set in the regular position as shown in FIG. 14A.

As described above, according to the present invention, a face located on a front of a face detaching surface is retracted into a casing, and at this time, an opening formed in the face detaching surface is covered by an end portion of the face or a cover, making it possible to look as if the face had been removed from the face detaching surface. With this arrangement, the in-car electronic device can be protected from a thief.

A face is accommodated in a casing. This arrangement eliminates a possibility of losing a face of a conventional detachable face type that is carried out of a car compartment. Moreover, the face is configured so that it is shifted from a regular position to a horizontal position when it is withdrawn into the casing. This configuration requires a simple structure of a mechanism for moving the face between the regular position and a retracted position.

When the face is set back to the regular position from the retracted position, the face cannot be activated unless a predetermined password signal is entered. Therefore, even if an unauthorized person succeeds in setting the face in the regular position, operation of device is disabled, thus preventing the device from being stolen. When the password signal is composed of a combination of a rotational direction and/or a rotational amount of a rotary control member, the password signal can be made more difficult to be deciphered, whereas it becomes easier to enter the password signal.

What is claimed is:

1. An in-car electronic device with an anti-theft feature, comprising:
   a fixed front surface that is provided on a front surface of a casing incorporating an electronic circuit and mainly formed of a flat surface;
   a movable member which can be installed in a regular position to cover a front of the fixed front surface, and a surface of which is provided with a control surface having at least one of a display member and a control member; and position changing means for moving the movable member between the regular position and a retracted position where the movable member is circularly moved by substantially 90 degrees from the regular position so as to be retracted in an opening, wherein an end portion of the movable member is provided with a protuberant portion that extends toward a front surface providing a control surface or toward a rear surface, and when the movable member moves toward the retracted position, the opening is closed by the end portion of the movable member after said at least one of the display member and the control member passes by the opening, and wherein an end surface of the movable member in the retracted position is substantially flush with the fixed front surface.

2. An in-car electronic device with an anti-theft feature according to claim 1, wherein the position changing means is driven by power of a motor driver, and the movable member can be automatically moved between the regular position and the retracted position by the power of the motor driver.

3. An in-car electronic device with an anti-theft feature according to claim 2, wherein the motor driver is controlled so that the movable member is stopped in a state wherein the control surface is aslant in the middle of a travel of the movable member from the regular position to the retracted position.

4. An in-car electronic device with an anti-theft feature according to claim 2, wherein, when one direction along an arbitrary lateral edge of the fixed front surface is defined as a first side, and the other direction is defined as a second side, the opening is provided at a position closer to the first side in the fixed front surface; and the movable member is controlled in its position by the position changing means so that an end portion thereof on the first side advances forward from the regular position and an end portion thereof on the second side circularly moves toward the first side, then the end portion on the second side is oriented toward the casing and entered into the opening to reach the retracted position.

5. An in-car electronic device with an anti-theft feature according to claim 2, wherein the fixed front surface is provided with a secret control member for projecting the retracted movable member from the opening.

6. An in-car electronic device with an anti-theft feature according to claim 1, wherein a password signal for authorizing display operation and/or control of the movable member is enabled to be entered using a control member provided on the control surface of the movable member, when the movable member is projected to an accessible position from the retracted position.

7. An in-car electronic device comprising:

a fixed front surface that is provided on a front surface of a casing having an electronic circuit therein and mainly formed of a flat surface;

a movable member which can be installed in a regular position to cover a front of the fixed front surface and a surface of which is provided with a control surface having at least one of a display member and a control member;

position changing means for moving the movable member between the regular position and a retracted position where the movable member is circularly moved by substantially 90 degrees from the regular position so as to be fully retracted in an opening; and a cover provided on the movable member that covers the opening when the movable member is in the retracted position.

8. An electronic device comprising:

a casing;

a movable member provided with at least one of a display member and a control member; and position control means for moving the movable member between a retracted position where the movable member is retracted in the casing and a regular position where the movable member is oriented perpendicularly to the retracted position after the movable member is drawn out of the casing, wherein the position control means comprises:

a first support point and a second support point at which the movable member is supported laterally;

a reciprocating member that is coupled to the first support point and moves forward and backward along the casing;

a position changing member having one end thereof coupled to the second support point and the other end thereof provided with a control support point engaging the reciprocating member;

a switching member having a retracted position guiding portion that guides the control support point toward a rear of the casing to move the movable member to the retracted position when the reciprocating member recedes from an advanced position, a regular position guiding portion that restricts a backward movement of the control support point to allow the movable member to move to the regular position when the reciprocating member recedes from the advanced position, and a shifting portion having a switching portion that switches between the retracted position guiding portion and the regular position guiding portion; and a selecting member for selecting whether the control support point should be led to the retracted position guiding portion or the regular position guiding portion when the reciprocating member recedes from the advanced position.

9. An electronic device according to claim 8, wherein the selecting member is set at a restricting position where it blocks the retracted position guiding portion to restrain the control support point from moving back into the retracted position guiding portion when the control support point moves from the retracted position to a front end of the retracted position guiding portion, and at a restriction release position where the selecting member clears the foregoing restriction so as to allow the control support point to enter the retracted position guiding portion when the reciprocating member travels backward from the regular position.

10. An electronic device according claim 9, wherein the selecting member is urged toward the restricting position by an urging member, and when the movable member shifts to the regular position, a moving force of the control support point toward the regular position guiding portion causes the selecting member to be slightly locked in the restriction release position, or when the movable member shifts to the retracted position, the moving force of the control support point traveling away from the retracted position guiding portion releases the slight lock.

11. An electronic device according to claim 9, wherein the reciprocating member comprises a guiding section where the control support point moves, and the guiding section is equipped with a linear guiding portion extending longitudinally, a slant guiding portion that leads the control support point to the retracted position guiding portion when the reciprocating member advances, and another slant guiding portion that leads the control support point to the regular position guiding portion when the reciprocating member recedes.

12. An electronic device according to claim 9, wherein the reciprocating member is moved forward and backward by the power of the motor driver so as to automatically move the movable member between the regular position and the retracted position.

13. An electronic device according to claim 8, wherein
when one direction along an arbitrary lateral edge of a front panel provided on the front surface of the casing is defined as a first side, and the other direction is defined as a second side, the opening is provided at a position closer to the first side in the front panel;
the first support point is provided at the first side of the movable member, while the second support point is provided at a position closer to the second side away from the first support point;
the regular position guiding portion of the switching member is provided at a position closer to the second side away from the retracted position guiding portion; and
an end portion of the movable member on the first side advances and an end portion thereof on the second side circularly moves to approach the first side when the reciprocating member advances from the regular position, then the end portion on the second side enters the opening first and reaches the retracted position when the reciprocating member recedes.

14. An electronic device according to claim 13, wherein the regular position guiding portion extends toward the rear beyond the dividing portion and in parallel to the retracted position guiding portion, and is shorter than the retracted position guiding portion, and as the reciprocating member advances when the movable member is in the regular position, the control support point advances in the regular position guiding portion, and at this time, the movable member moves forward in parallel, then when the reciprocating member recedes, the control support point shifts via the dividing portion to the retracted position guiding portion, thus setting the movable member substantially perpendicular to the front surface of the front panel to place the movable member in the casing.

15. An electronic device comprising:
a casing;
a movable member equipped with at least one of a display member and a control member; and
position control means for moving the movable member between a retracted position where the movable member is accommodated in the casing and a regular position where the movable member is oriented perpendicularly to the retracted position or inclined at a predetermined angle after the movable member projects out of the casing,
wherein the position control means comprises:
a motor driver;
a first support point and a second support point at which the movable member is supported laterally;
a reciprocating member that is coupled to the first support point and moves forward and backward along the casing;
a motion converting means for causing the reciprocating member to move forward and backward once by a rotational power of the motor driver in a first direction, and also causing the reciprocating member to move forward and backward once by the rotational power of the motor driver in a second direction; and
switching means for switching a moving path of the second support point so that the movable member in the regular position is circularly moved to the retracted position when the reciprocating member is moved forward and backward once by the revolution of the motor driver in the first direction, and that the movable member in the retracted position is projected out of the casing and further circularly moved into the regular position when the reciprocating member is moved forward and backward once by the revolution of the motor driver in the second direction.

16. An electronic device according to claim 15, wherein the motion converting means comprises a rotating member rotatably driven in one direction by a rotational power in the first direction of the motor driver and in the other direction by the rotational power in the second direction, and a sliding member that slides a drive cam portion provided on either the reciprocating member or the rotating member against the driving cam portion provided on the other to thereby reciprocate the reciprocating member.

17. An electronic device according to claim 15, wherein the switching means comprises:
a control support point provided on a position changing member rotatably coupled to the second support point;
a switching member having a retracted position guiding portion that guides the control support point toward a rear of the casing to move the movable member to the retracted position when the reciprocating member moves backward from an advanced position, a regular position guiding portion that restricts a backward movement of the control support point to allow the movable member to move to the regular position when the reciprocating member moves backward from the advanced position, a switching portion that switches between the retracted position guiding portion and the regular position guiding portion; and
a selecting member for selecting whether the control support point should be led to the retracted position guiding portion or the regular position guiding portion when the reciprocating member recedes from the advanced position.

18. An electronic device according to claim 15, wherein the movable member can be stopped at an arbitrary orientation outside the casing by stopping the motor driver in the middle of a reciprocating travel of the reciprocating member when the motor driver rotates in the first direction, or in the middle of a reciprocating travel of the reciprocating member when the motor driver rotates in the second direction.

19. An electronic device according to claim 15, wherein
when one direction along an arbitrary lateral edge of a front panel of the casing is defined as a first side, and the other direction is defined as a second side, the opening is provided at a position closer to the first side in the front panel;
the first support point is provided at the first side of the movable member, while the second support point is provided at a position closer to the second side away from the first support point;

the regular position guiding portion of the switching member is provided at the second side away from the retracted position guiding portion; and an end portion of the movable member on the first side advances forward and an end portion thereof on the second side circularly moves toward the first side when the reciprocating member advances from the regular position, then the end portion on the second side enters the opening first when the movable member is set in the retracted position as the reciprocating member recedes.

* * * * *